United States Patent
Cornish et al.

(10) Patent No.: US 7,790,036 B2
(45) Date of Patent: *Sep. 7, 2010

(54) RAPID EXPANDED SOLVENT EXTRACTION

(75) Inventors: Katrina Cornish, Casa Grande, AZ (US); Rodger T. Marentis, Allentown, PA (US)

(73) Assignee: Yulex Corporation, Maricopa, AZ (US)

( * ) Notice: Subject to any disclaimer, the term of this patent is extended or adjusted under 35 U.S.C. 154(b) by 87 days.

This patent is subject to a terminal disclaimer.

(21) Appl. No.: 11/873,363

(22) Filed: Oct. 16, 2007

(65) Prior Publication Data

US 2009/0099327 A1    Apr. 16, 2009

(51) Int. Cl.
| | |
|---|---|
| B01D 11/00 | (2006.01) |
| B01D 11/04 | (2006.01) |
| B01D 15/04 | (2006.01) |
| B01D 15/00 | (2006.01) |
| C02F 1/26 | (2006.01) |
| C02F 1/44 | (2006.01) |
| C02F 1/42 | (2006.01) |
| C08G 83/00 | (2006.01) |

(52) U.S. Cl. .................. 210/634; 210/638; 210/639; 528/1; 528/930

(58) Field of Classification Search ............... 210/634, 210/638, 639; 528/1, 930
See application file for complete search history.

(56) References Cited

U.S. PATENT DOCUMENTS

| | | | | |
|---|---|---|---|---|
| 2,373,689 | A | * | 4/1945 | Kenda .................... 524/9 |
| 4,136,131 | A | * | 1/1979 | Buchanan .............. 528/493 |
| 4,435,337 | A | * | 3/1984 | Kay et al. .............. 528/493 |
| 4,681,929 | A | * | 7/1987 | Cole et al. ............. 528/493 |
| 4,684,715 | A | * | 8/1987 | Kay et al. .............. 528/493 |
| 4,877,530 | A | * | 10/1989 | Moses .................... 210/511 |
| 5,155,040 | A | * | 10/1992 | Kula et al. ............. 435/183 |
| 5,321,111 | A | * | 6/1994 | Ji ............................ 528/1 |
| 5,653,884 | A |  | 8/1997 | Smart et al. |
| 5,717,050 | A | * | 2/1998 | Cornish .................. 528/1 |
| 6,106,720 | A | * | 8/2000 | Kanel et al. ............ 210/634 |
| 6,235,860 | B1 |  | 5/2001 | Kang et al. |
| 6,241,890 | B1 |  | 6/2001 | Clay et al. |
| 6,589,422 | B2 | * | 7/2003 | Low ....................... 210/259 |

(Continued)

FOREIGN PATENT DOCUMENTS

EP    164137 A  * 12/1985

(Continued)

OTHER PUBLICATIONS

International Search Report dated May 1, 2008, for application PCT/US07/83470 filed on Nov. 2, 2007.

(Continued)

*Primary Examiner*—Mark Eashoo
*Assistant Examiner*—Liam J Heincer
(74) *Attorney, Agent, or Firm*—Christine Meis McAuliffe; Polsinelli Shughart PC

(57) ABSTRACT

The present disclosure provides for a method of rapid expanded solvent extraction of biopolymers, such as rubber, from plant materials, such as guayule, using an expanded hexane solvent. As is illustrated herein, the use of the expanded hexane solvent results in a markedly more efficient and rapid extraction process over other supercritical carbon dioxide extraction systems, including those systems using a hexane cosolvent.

10 Claims, 19 Drawing Sheets

U.S. PATENT DOCUMENTS

| | | |
|---|---|---|
| 7,259,231 B2 | 8/2007 | Cornish et al. |
| 7,431,841 B2 * | 10/2008 | Herold et al. ............... 210/634 |
| 2006/0106183 A1 * | 5/2006 | Cornish et al. ................. 528/1 |
| 2006/0149015 A1 * | 7/2006 | Cornish et al. ................. 528/1 |
| 2007/0276112 A1 * | 11/2007 | Buranov ........................ 528/1 |
| 2008/0015336 A1 * | 1/2008 | Cornish et al. ............. 528/498 |
| 2008/0233238 A1 * | 9/2008 | Roney et al. ................. 426/50 |
| 2009/0110792 A1 * | 4/2009 | Marentis et al. ............ 426/481 |

FOREIGN PATENT DOCUMENTS

| | | |
|---|---|---|
| JP | 64000102 | 1/1989 |
| WO | 2007/046859 | 4/2007 |

OTHER PUBLICATIONS

Jacobs, Marcus, "Measurement and Modeling of Thermodynamic Properties for Processing Polymers in Supercritical Fluids" Eindhoven, the Netherlands: Dissertation given at Technische Universiteit, Sep. 13, 2004, pp. 43-62, particularly p. 45.

* cited by examiner

US 7,790,036 B2

RAPID EXPANDED SOLVENT EXTRACTION

FIELD OF THE INVENTION

This invention relates in general to the extraction of biopolymers from plant materials, and more specifically to a fast and efficient system for expanded extraction of biopolymers from plant species containing biopolymers such as polyisoprene (rubber).

BACKGROUND OF THE INVENTION

Guayule is a desert shrub native to the southwestern United States and northern Mexico and which produces polymeric isoprene essentially identical to that made by *Hevea* rubber trees (e.g., *Hevea brasiliensis*) in Southeast Asia. As recently as 1910 it was the source of half of the natural rubber used in the U.S. Since 1946, however, its use as a source of rubber has been all but abandoned in favor of cheaper *Hevea* rubber and synthetic rubbers. Still, demand for natural rubber is expected to produce shortages of that material in the future and rubber prices are expected to rise significantly. Natural rubber having lower heat hysteresis is required for many kinds of tires and amounts to about 35% of U.S. rubber use.

As an alternative to synthetic rubber sources, attention is being directed to the production of hydrocarbons in plants such as guayule (*Parthenium argentatum*). Guayule normally yields one half ton to one ton of rubber per acre in cultivation when, after two years, the entire plant is harvested and processed. Guayule plants store latex in tiny inclusions in the bark, making harvest of the outer fibrous layers, or bagasse, of the plant, desirable.

DETAILED DESCRIPTION

Figure 1:
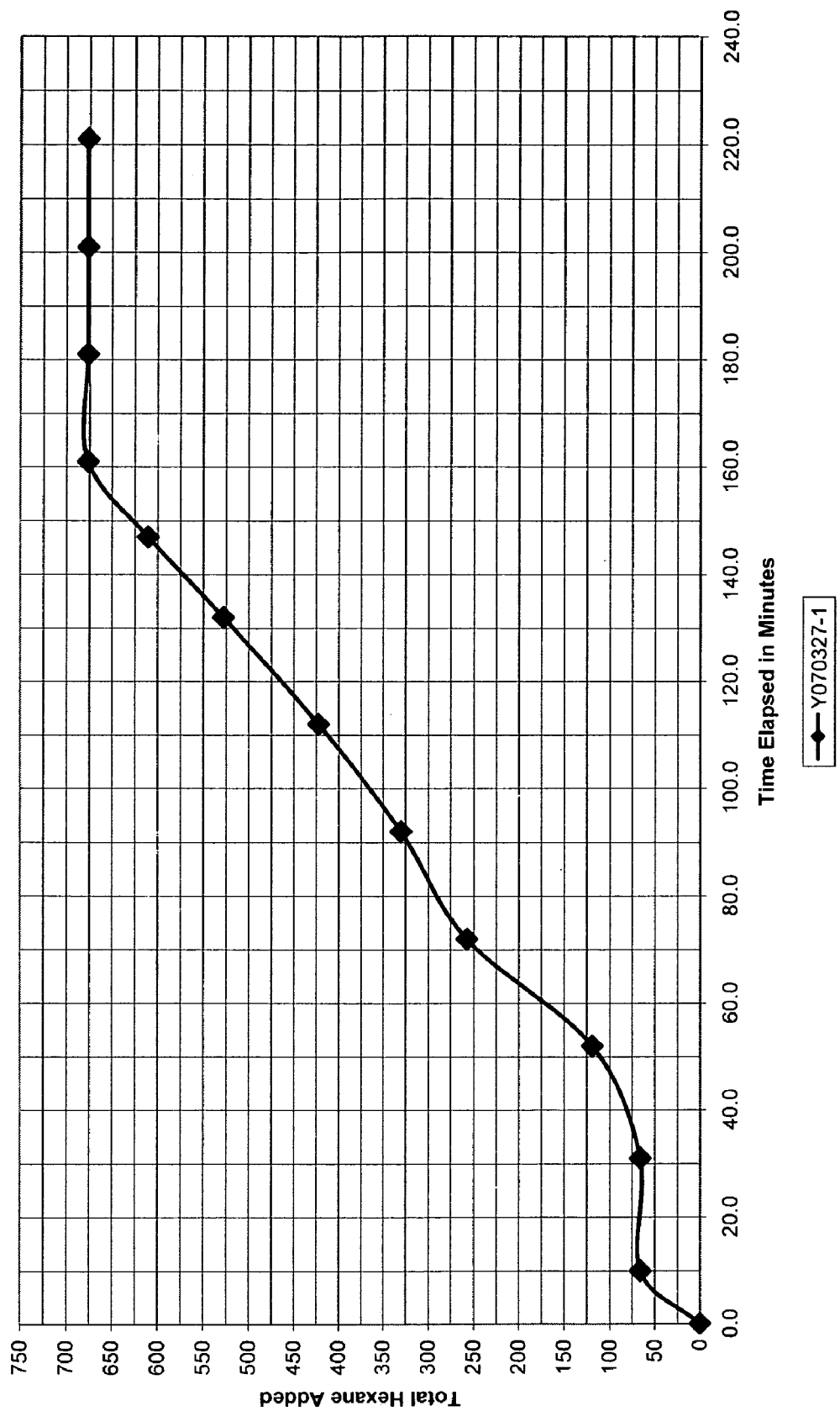
FIGS. 1-16 graphically illustrate aspects of the protocols for the below-described examples of the present disclosure.

The present disclosure provides for a method of rapid expanded solvent extraction of biopolymers, such as rubber, from plant materials, such as guayule, using an expanded hexane solvent. As is illustrated below, the use of the expanded hexane solvent results in a markedly more efficient and rapid extraction process over other supercritical carbon dioxide extraction systems, including those systems using a hexane cosolvent. The disclosed expanded solvent system is capable of extracting biopolymers from plant materials in as little as five to ten minutes, when compared to eight hours in other known extraction systems. Further, the yield of 15-20% or more of biopolymer in the extraction process is extremely high when compared with previously known extraction methods. Finally, very little solvent is required for the presently disclosed process; specifically, expanded extraction can be carried out using the disclosed process with a 2:1 or 3:1 solvent ration versus 18:1 in a traditional Soxhlet extraction.

Although the present disclosure is applicable and discloses a method of expanded solvent extraction for multiple biopolymers from many plant species, expanded solvent extraction of rubber from guayule is provided here as an exemplar of the novelty and usefulness of this process. Other plant species that can be used include, but are not limited to, gopher plant (*Euphorbia lathyris*), mariola (*Parthenium incanum*), rabbitbrush (*Chrysothamnus nauseosus*), candelilla (*Pedilanthus macrocarpus*), Madagascar rubbervine (*Cryptostegia grandiflora*), milkweeds (*Asclepias syriaca, speciosa, subulata*, et al.), goldenrods (*Solidago altissima, graminifolia, rigida*, et al.), Russian dandelion (*Taraxacum kok-saghyz*), mountain mint (*Pycnanthemum incanum*), American germander (*Teucreum canadense*), and tall bellflower (*Campanula americana*). Many other plants which produce rubber and rubber-like hydrocarbons are known, particularly among the *Asteraceae* (*Compositae*), *Euphorbiaceae, Campanulaceae, Labiatae*, and *Moraceae* families.

The extraction process of biopolymers, including rubber, from plant materials, is extremely sensitive to the concentration of the hexane in the extractor during the course of the extraction cycle. Rubber is only extracted at significant rates when the concentration of hexane in the extractor is extremely high and the solvent system can be best characterized as an expanded hexane solvent (rather than a supercritical carbon dioxide solvent with hexane cosolvent).

The rubber extraction efficiency of the process is directly related to the concentration of the hexane cosolvent in the extractor at the beginning of the extraction cycle. An expanded hexane solvent extraction is defined as a binary solvent system in which the carbon dioxide cosolvent is utilized to expand the volume and lower the density of the hexane solvent, which apparently enhances the capability of the hexane solvent for rapid mass transfer of the rubber from the botanical matrix. After the expanded hexane extraction is completed, which, as discussed above, takes approximately a hexane solvent/feedstock ratio of 2:1 or 3:1 by weight, supercritical carbon dioxide continues to run through the residue bed to remove all of the remaining hexane from the guayule shrub residue.

Thus, the extraction results are highly sensitive to the rate of cosolvent addition and, perhaps, how the cosolvent is introduced into the vessel. As described in this disclosure, the highly variable nature of the process at similar extraction conditions and the difference between the favorable and less favorable results are due to the initial concentration levels of solvent achieved for each of the experiments. Therefore, when the carbon dioxide solvent is supersaturated with the hexane solvent, high yields of rubber were achieved. And conversely, when the hexane solvent was metered into the extraction vessel at less than super saturation concentration levels, the yield is significantly lower.

Additionally, according to the present disclosure, the hexane solvent is introduced into the vessel first (before the carbon dioxide fills the extraction vessel) to ensure that a very high concentration of hexane is present in the vessel from the start of the extraction. It is also important that the hexane solvent level be maintained at a high concentration during the extraction until all of the hexane cosolvent is used up. If the hexane is metered into the extraction vessel at concentrations below 50%, very little rubber extraction will occur. Thus, the present disclosure provides for the relative weight of hexane in the extraction vessel to be 90% hexane to 10% weight of carbon dioxide.

The extraction of rubber from guayule shrub feedstock (whether previously extracted with carbon dioxide to remove resin or not) was highly sensitive to the rate of hexane metering at the beginning of the extraction cycle. The higher concentration of hexane relative to carbon dioxide, the better the extraction efficiency for removing rubber from the guayule shrub feedstock. Thus, the present disclosure provides for the ratio in the range of 3:1 or 2:1 to totally extract the rubber from the guayule shrub feedstock.

Hexane solvent expanded with supercritical carbon dioxide can rapidly extract from whole guayule shrub or just rubber from previously carbon dioxide extracted guayule shrub, wherein the resin was previously extracted using the carbon dioxide extraction. However, the scale-up experiments on both the leaf and the bagasse have shown that it is difficult to extract all of the resin with pure carbon dioxide. Analysis has shown that the guayule shrub contains 2-3% residual resin after supercritical extraction is completed. This is probably due to the rubber in the guayule shrub somehow blocking some of the resin within the matrix of the ground shrub feedstock powder. This means that when the second extraction is performed with hexane, the remaining resin will be extracted with the rubber.

Thus, a process in which the supercritical carbon dioxide extraction process described in U.S. Pat. No. 7,259,231 (Cornish, et al.) is augmented with the currently disclosed expanded hexane solvent that can extract both resin and rubber from a whole shrub which has both resin and rubber is further disclosed as a new and improved method of biopolymer extraction from plant materials. The extract from this rubber and resin extraction process can then be further extracted with supercritical carbon dioxide, first to remove residual hexane at relatively low pressure, and then to remove resin (and other compounds) at relatively high pressure.

The following are non-limiting examples that further illustrate the particular method of the present disclosure. The presently disclosed extraction process can be used to extract rubber and resin from guayule whole shrub (*Partheniun argentatum*) (resin and rubber), leaf stream (resin only), bagasse (resin only) and previously supercritical carbon dioxide extracted guayule whole shrub (mostly rubber).

EXAMPLE 1

167.57 g of previously extracted guayule shrub residue feedstock Y070125-1R was placed in a 600 ml extraction vessel and extracted with pure carbon dioxide at a pressure of 7250 psi and a temperature of 100° C. for 221 minutes. Over this time 677 g (4× the feedstock weight) of hexane was pumped into the extractor, with a very small amount being pumped before $CO_2$ gas flow to prime the pump, and the majority afterwards at extraction pressure. The average flow rate was 9 liters/minute. There is 0.08 g of dark orange extract collected in a bottle. The residue weighs 158.10 g. The protocol is further illustrated by Table 1 and FIG. 1.

TABLE 1

| Y070327-1 | | | | | |
|---|---|---|---|---|---|
| Elapsed time | Ratio solvent/sample | % extracted | Hexane added (ml) | Total Hexane (g) | Hexane/ sample |
| 0.0 | 0.0 | 0.0 | 0.0 | 0 | 0.00 |
| 10.0 | 0.0 | 0.0 | 100.0 | 66 | 0.39 |
| 31.0 | 2.7 | 0.0 | 0.0 | 66 | 0.39 |
| 52.0 | 5.4 | 0.2 | 80.0 | 119 | 0.71 |
| 72.0 | 8.0 | 1.2 | 210.0 | 257 | 1.54 |
| 92.0 | 10.6 | 1.2 | 110.0 | 330 | 1.97 |
| 112.0 | 13.2 | 1.4 | 140.0 | 422 | 2.52 |
| 132.0 | 14.7 | 0.1 | 160.0 | 528 | 3.15 |
| 147.0 | 15.8 | 0.2 | 125.0 | 611 | 3.64 |
| 161.0 | 16.8 | 0.1 | 100.0 | 677 | 4.04 |
| 181.0 | 18.3 | −72.6 | 0.0 | 677 | 4.04 |
| 201.0 | 19.6 | −72.6 | 0.0 | 677 | 4.04 |
| 221.0 | 21.8 | −72.6 | 0.0 | 677 | 4.04 |

This experiment was unsuccessful (only 0.08 g extracted) in spite of the fact that 4 times the feedstock weight of hexane was used. The primary reason why very little rubber was extracted was because the hexane was metered into the extractor at a very low concentration and the hexane acted as a cosolvent instead of as an expanded solvent.

EXAMPLE 2

Figure 2:
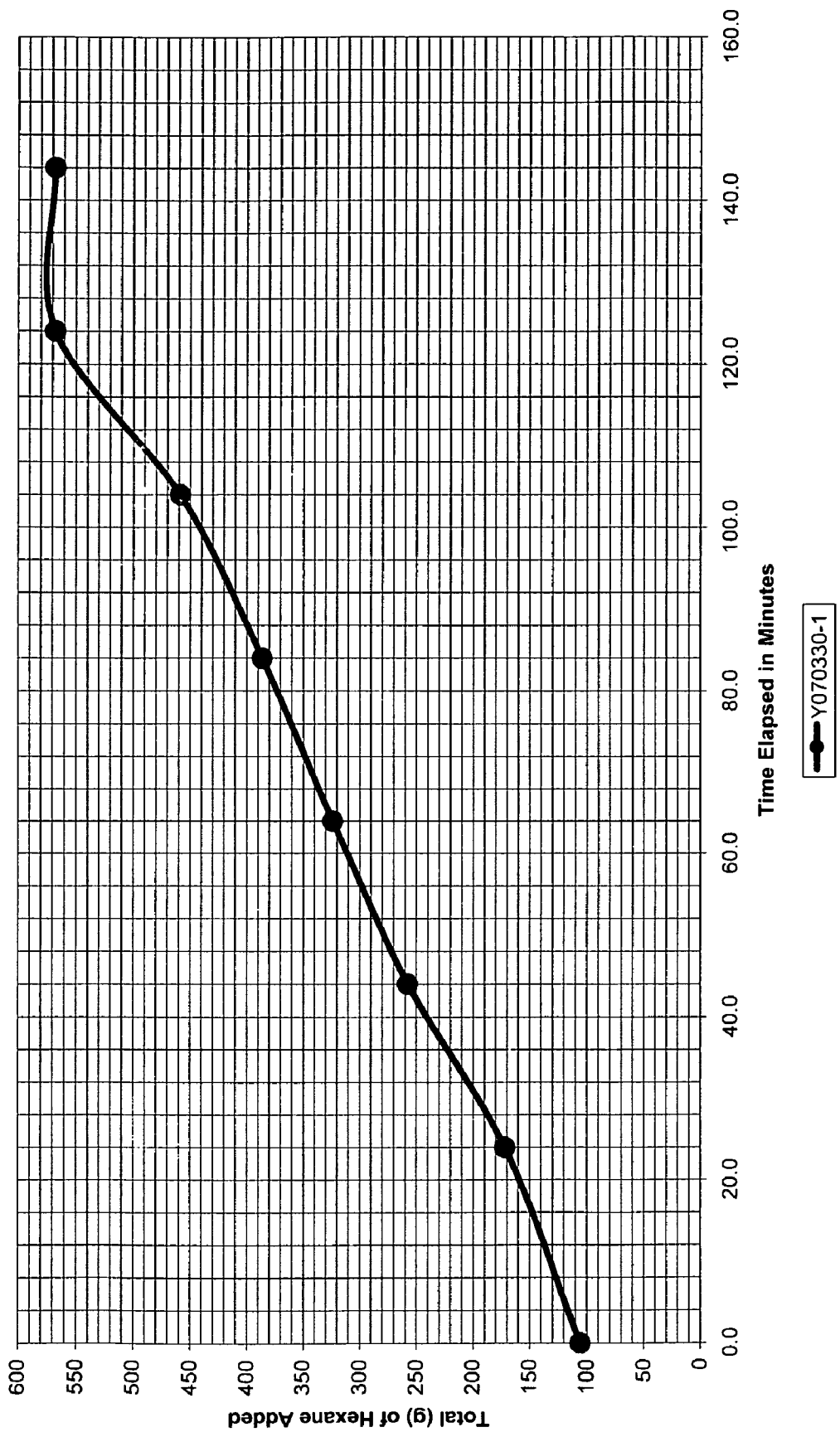

181.14 g of previously extracted guayule shrub residue feedstock Y070125-1R was placed in a 600 ml extraction vessel and extracted with pure carbon dioxide at a pressure of 7250 psi and a temperature of 100° C. for 144 minutes. Over this time 568 g (3× the feedstock weight) of hexane was pumped into the extractor, beginning after the vessel pressurized with $CO_2$ at 6,000 psi. The average flow rate was 5 liters/minute. While extracting, the hexane ceased to remove rubber and came out clear after only half the total amount of hexane used had entered the system. When residue was removed, it was soaked with hexane which was allowed to evaporate. After this, the residue weighed 180.5 g. The extract collected measured only 0.19 g. The protocol is further illustrated by Table 2 and FIG. 2.

TABLE 2

| Y070330-1 | | | | | |
|---|---|---|---|---|---|
| Elapsed time | Ratio solvent/sample | % extracted | Hexane added (ml) | Total Hexane (g) | Hexane/ sample |
| 0.0 | 0.0 | 0.0 | 160.0 | 106 | 0.58 |
| 24.0 | 1.2 | 0.8 | 100.0 | 172 | 0.95 |
| 44.0 | 2.0 | −67.0 | 130.0 | 257 | 1.42 |
| 64.0 | 2.8 | −67.0 | 100.0 | 323 | 1.79 |
| 84.0 | 3.6 | 0.1 | 95.0 | 386 | 2.13 |
| 104.0 | 4.8 | −67.0 | 110.0 | 459 | 2.53 |
| 124.0 | 6.0 | −67.0 | 165.0 | 568 | 3.13 |
| 144.0 | 7.0 | −67.0 | | 568 | 3.13 |

This experiment actually gave slightly better results than the previous experiment, extracting 0.19 g as opposed to 0.08 g in spite of the fact that the hexane to feedstock ratio was reduced to 3 to 1 demonstrating a surprising insensitivity to total hexane cosolvent used.

EXAMPLE 3

Figure 3:
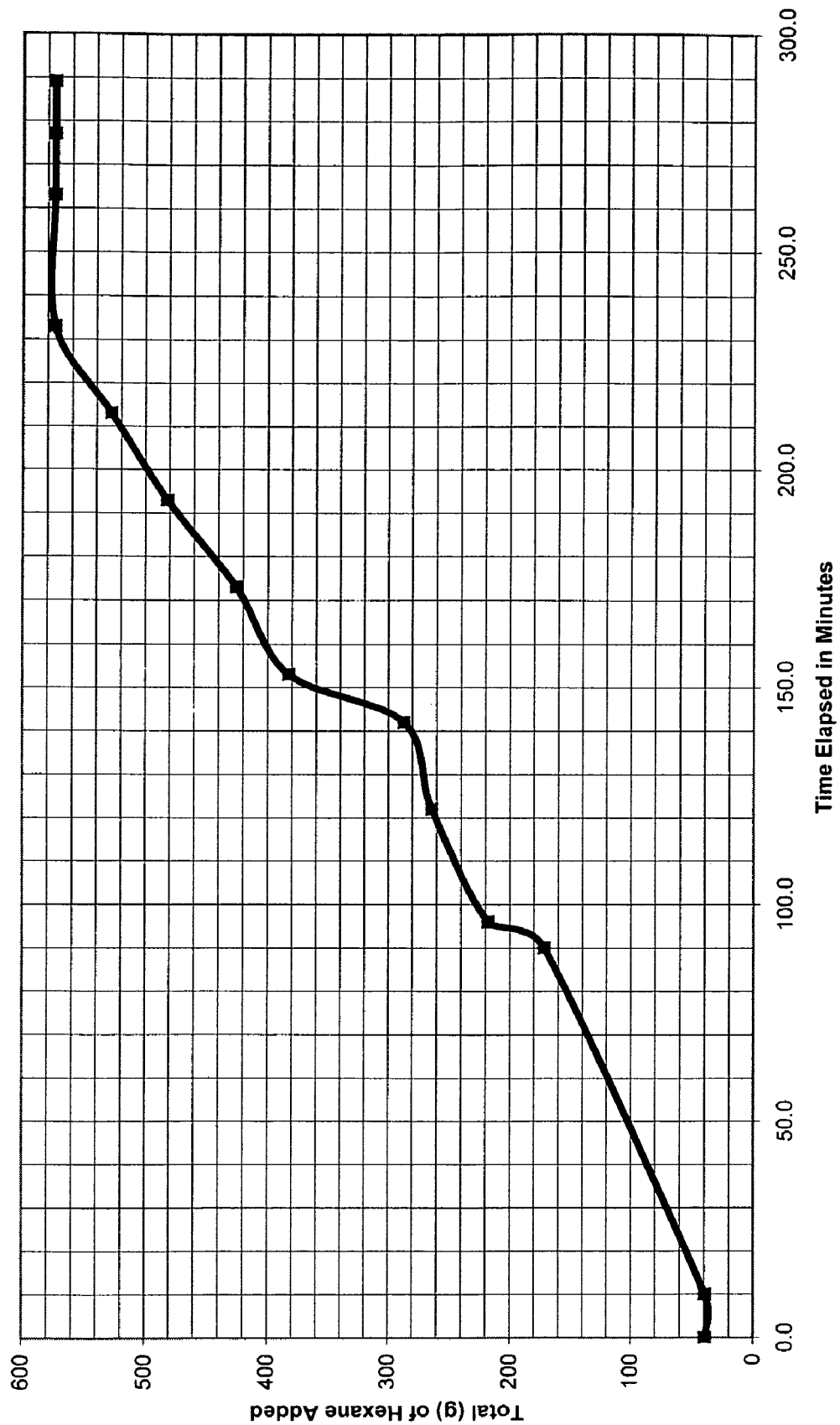

For this experiment, the residue from Y070330-1 was used as feedstock. 180.50 g of previously extracted guayule shrub residue feedstock was placed in a 600 ml extraction vessel and extracted with pure carbon dioxide at a pressure of 7,250 psi and a temperature of 100° C. for 289 minutes. Over this time 574 g (3× the feedstock weight) of hexane was pumped into the extractor. 60 g was pumped in first to prime the pump, and then the pressure was raised to 2,400 psi. The pressure was brought back down to 100 psi, 200 g hexane pumped in, then pressure raised to 3,800 psi. Another 70 g hexane was pumped in, then pressure raised to 7,500 and then began extraction, the rest of the hexane being pumped in during extraction. The average flow rate was 4 liters/minute. There was 0.47 g of dark green extract collected in a separate extract bottle. The residue weighs 169.3 g. The protocol is further illustrated by Table 3 and FIG. 3.

TABLE 3

Y070403-1

| Elapsed time | Ratio solvent/sample | % extracted | Hexane added (ml) | Total Hexane (g) | Hexane/sample |
|---|---|---|---|---|---|
| 0.0 | 0.0 | 0.0 | 60.0 | 40 | 0.22 |
| 10.0 | 0.0 | 0.0 | 0.0 | 40 | 0.22 |
| 90.0 | 0.0 | 0.0 | 200.0 | 172 | 0.95 |
| 96.0 | 0.3 | 0.0 | 70.0 | 218 | 1.21 |
| 122.0 | 1.1 | −17.0 | 70.0 | 264 | 1.46 |
| 142.0 | 2.1 | −17.0 | 35.0 | 287 | 1.59 |
| 153.0 | 2.5 | −17.0 | 145.0 | 383 | 2.12 |
| 173.0 | 3.3 | −17.0 | 65.0 | 426 | 2.36 |
| 193.0 | 4.1 | −17.0 | 85.0 | 482 | 2.67 |
| 213.0 | 4.4 | −17.0 | 70.0 | 528 | 2.93 |
| 233.0 | 4.7 | −17.0 | 70.0 | 574 | 3.18 |
| 263.0 | 6.2 | −17.0 | 0.0 | 574 | 3.18 |
| 277.0 | 7.9 | −17.0 | 0.0 | 574 | 3.18 |
| 289.0 | 8.6 | −17.0 | 0.0 | 574 | 3.18 |

This experiment was also unsuccessful in spite of changing the mode in which the hexane was pumped into the extractor. The ratio of hexane to feedstock remained at 3 to 1 and the extracted amount improved to 0.47 g.

EXAMPLE 4

Figure 4:
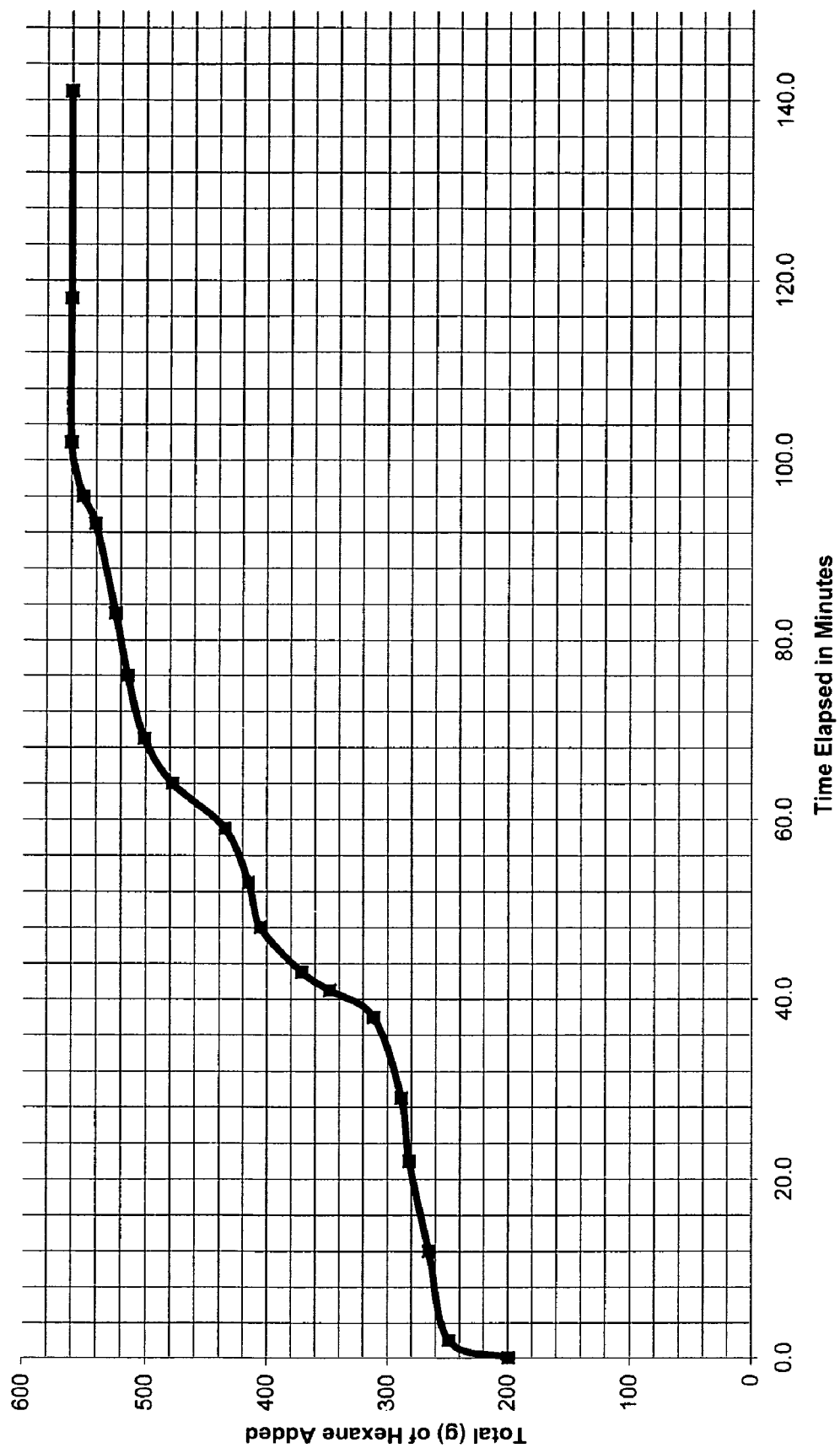

174.58 g of previously extracted guayule shrub residue feedstock Y070125-1R was presoaked with 154.67 g of hexane before being placed in a 600 ml extraction vessel. It was then extracted with pure carbon dioxide at a pressure of 7,250 psi and a temperature of 100° C. for 141 minutes. Over this time an additional 406 g (560 g total, 3× the feedstock weight when including pre-soak amount) of hexane was pumped into the extractor. First 45 g was pumped in, then began $CO_2$ flow and brought pressure up to 800 psi. Then 66 g was added, after which gas pressure was brought up to 7,250 and extraction started, the rest of the hexane being added during the extraction. The average flow rate was 4 liters/minute. There is 5.11 g of dark yellow extract collected in an extract bottle. The residue weighs 163.68 g. The protocol is further illustrated by Table 4 and FIG. 4.

TABLE 4

Y070419-1

| Elapsed time | Ratio solvent/sample | % extracted | Hexane added (ml) | Total Hexane (g) | Hexane/sample |
|---|---|---|---|---|---|
| 0.0 | 0.0 | 0.0 | 70.0 | 199 | 1.14 |
| 2.0 | 0.0 | 0.0 | 75.0 | 249 | 1.43 |
| 12.0 | 0.0 | 0.0 | 25.0 | 265 | 1.52 |
| 22.0 | 0.3 | −17.7 | 25.0 | 282 | 1.61 |
| 29.0 | 0.5 | −17.7 | 10.0 | 288 | 1.65 |
| 38.0 | 0.7 | −17.7 | 35.0 | 312 | 1.78 |
| 41.0 | 0.9 | −17.7 | 55.0 | 348 | 1.99 |
| 43.0 | 1.0 | −17.7 | 35.0 | 371 | 2.12 |
| 48.0 | 1.2 | −17.7 | 52.0 | 405 | 2.32 |
| 53.0 | 1.5 | −17.7 | 15.0 | 415 | 2.38 |
| 59.0 | 1.8 | −17.7 | 30.0 | 435 | 2.49 |
| 64.0 | 2.0 | −17.7 | 65.0 | 478 | 2.74 |
| 69.0 | 2.1 | −17.7 | 35.0 | 501 | 2.87 |
| 76.0 | 2.1 | −17.7 | 20.0 | 514 | 2.95 |

TABLE 4-continued

Y070419-1

| Elapsed time | Ratio solvent/sample | % extracted | Hexane added (ml) | Total Hexane (g) | Hexane/sample |
|---|---|---|---|---|---|
| 83.0 | 2.3 | −17.7 | 15.0 | 524 | 3.00 |
| 93.0 | 2.5 | −17.7 | 25.0 | 541 | 3.10 |
| 96.0 | 2.6 | −17.7 | 15.0 | 550 | 3.15 |
| 102.0 | 2.8 | −17.7 | 15.0 | 560 | 3.21 |
| 118.0 | 3.5 | −17.7 | 0.0 | 560 | 3.21 |
| 141.0 | 4.4 | −17.7 | 0.0 | 560 | 3.21 |

This experiment resulted in a dramatic improvement in rubber extraction efficiency. This improvement was due to presoaking the guayule shrub in hexane prior to its being placed in the extraction vessel. Additionally, more hexane was added to the presoaked amount so that a relatively high concentration of hexane was in the extractor at the start of the extraction. This resulted in a tenfold increase of extract of 5.11 g.

EXAMPLE 5

Figure 5:
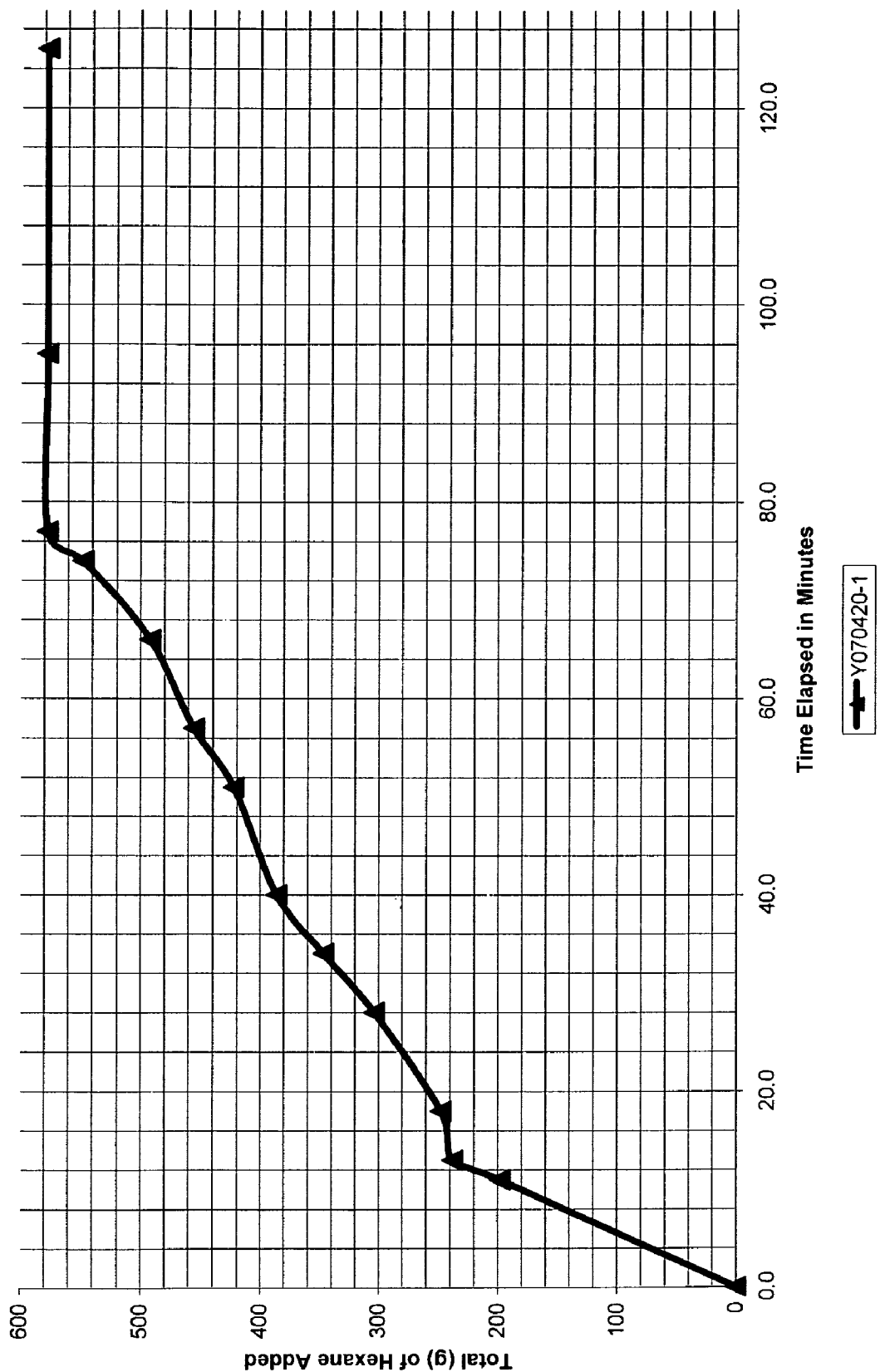

180.67 g of previously extracted guayule shrub residue feedstock Y070125-1R was placed in a 600 ml extraction vessel and extracted with pure carbon dioxide at a pressure of 7,250 psi and a temperature of 100° C. for 126 minutes. Over this time 578 g (3× the feedstock weight) of hexane was pumped into the extractor, with 248 g of hexane being pumped after $CO_2$ at low pressure of 800 psi, then the pressure brought up to 7,250, and the majority of 330 g pumped afterwards during extraction. The average flow rate was 4 liters/minute. 10.40 g of solid green extract is collected in an extract bottle. The residue weighs 168.01 g. The protocol is further illustrated by Table 5 and FIG. 5.

TABLE 5

Y070420-1

| Elapsed time | Ratio solvent/sample | % extracted | Hexane added (ml) | Total Hexane (g) | Hexane/sample |
|---|---|---|---|---|---|
| 0.0 | 0.0 | 0.0 | 0.0 | 0 | 0.00 |
| 11.0 | 0.0 | 0.0 | 300.0 | 198 | 1.10 |
| 13.0 | 0.0 | 0.0 | 60.0 | 238 | 1.32 |
| 18.0 | 0.0 | 0.0 | 15.0 | 248 | 1.37 |
| 28.0 | 0.4 | −16.9 | 85.0 | 304 | 1.68 |
| 34.0 | 0.7 | −16.9 | 65.0 | 347 | 1.92 |
| 40.0 | 1.0 | −16.9 | 60.0 | 386 | 2.14 |
| 51.0 | 1.4 | −16.9 | 55.0 | 422 | 2.34 |
| 57.0 | 1.7 | −16.9 | 50.0 | 455 | 2.52 |
| 66.0 | 1.9 | −16.9 | 55.0 | 492 | 2.72 |
| 74.0 | 2.2 | −16.9 | 85.0 | 548 | 3.03 |
| 77.0 | 2.3 | −16.9 | 45.0 | 578 | 3.20 |
| 95.0 | 3.0 | −16.9 | 0.0 | 578 | 3.20 |
| 126.0 | 4.2 | −16.9 | 0.0 | 578 | 3.20 |

This experiment brought about another dramatic increase to 10.4 g of solid green extract. These improved results were due to more aggressive metering of the hexane during the first third of the extraction.

EXAMPLE 6

Figure 6:
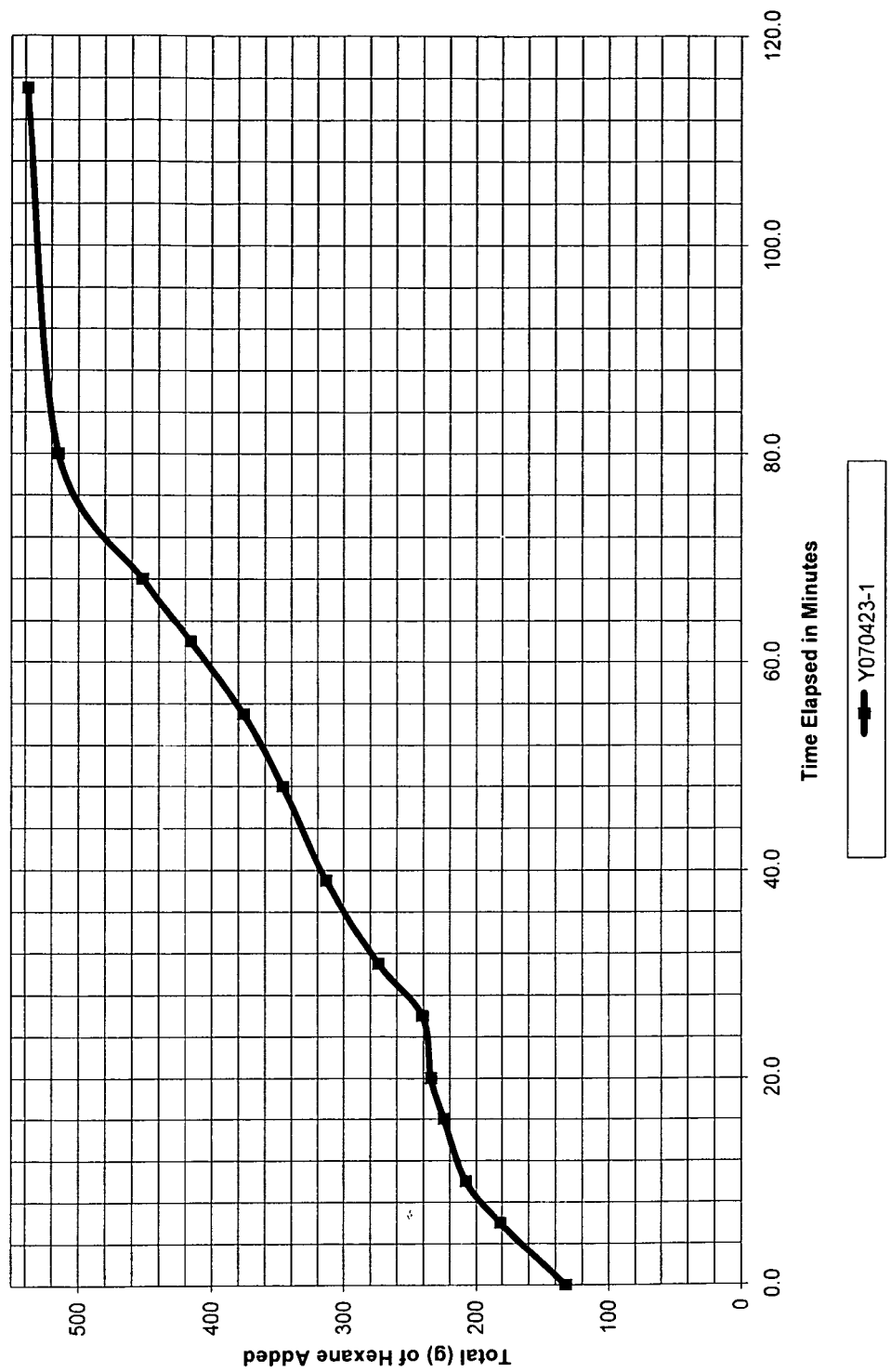

175.17 g of a mix of previously extracted guayule shrub residue feedstock Y070125-1R and Y070124-2R was placed in a 600 ml extraction vessel and extracted with pure carbon dioxide at a pressure of 7,250 psi and a temperature of 100° C.

for 115 minutes. Over this time 538 g (3× the feedstock weight) of hexane was pumped into the extractor, with 132 g of hexane being pumped before introducing $CO_2$, then adding 50 g while bringing the pressure up to 2,000, adding another 26 g while bringing the pressure up to 3,000, and then another 26 g until extract pressure and temperature reached and beginning flow. The average flow rate was 2 liters/minute. The extraction was stopped prematurely because of a block in the system. 13.10 g of solid dark green rubber is collected in an extract bottle. The residue weighs 166.14 g. The protocol is further illustrated by Table 6 and FIG. 6.

TABLE 6

Y070423-1

| Elapsed time | Ratio solvent/sample | % extracted | Hexane added (ml) | Total Hexane (g) | Hexane/ sample |
|---|---|---|---|---|---|
| 0.0 | 0.0 | 0.0 | 200.0 | 132 | 0.75 |
| 6.0 | 0.0 | 0.0 | 75.0 | 182 | 1.04 |
| 10.0 | 0.0 | 0.0 | 40.0 | 208 | 1.19 |
| 16.0 | 0.0 | 0.0 | 25.0 | 224 | 1.28 |
| 20.0 | 0.0 | 0.0 | 15.0 | 234 | 1.34 |
| 26.0 | 0.0 | 0.0 | 10.0 | 241 | 1.38 |
| 31.0 | 0.1 | −17.3 | 50.0 | 274 | 1.56 |
| 39.0 | 0.2 | −17.3 | 60.0 | 314 | 1.79 |
| 48.0 | 0.4 | −17.3 | 50.0 | 347 | 1.98 |
| 55.0 | 0.5 | −17.3 | 45.0 | 376 | 2.15 |
| 62.0 | 0.6 | −17.3 | 60.0 | 416 | 2.37 |
| 68.0 | 0.8 | −17.3 | 55.0 | 452 | 2.58 |
| 80.0 | 1.2 | −17.3 | 95.0 | 515 | 2.94 |
| 115.0 | 1.2 | −17.3 | 35.0 | 538 | 3.07 |

This experiment continued the optimization of the process by more aggressive metering of the hexane. This resulted in very rapid extraction of the rubber that caused a block in the metering valve exiting the extractor and the extraction was ended prematurely. In spite of the extraction not being completed, more than 13 g of solvent dark green extract was collected. This experiment illustrates a successful extraction according to the present disclosure.

EXAMPLE 7

Figure 7:
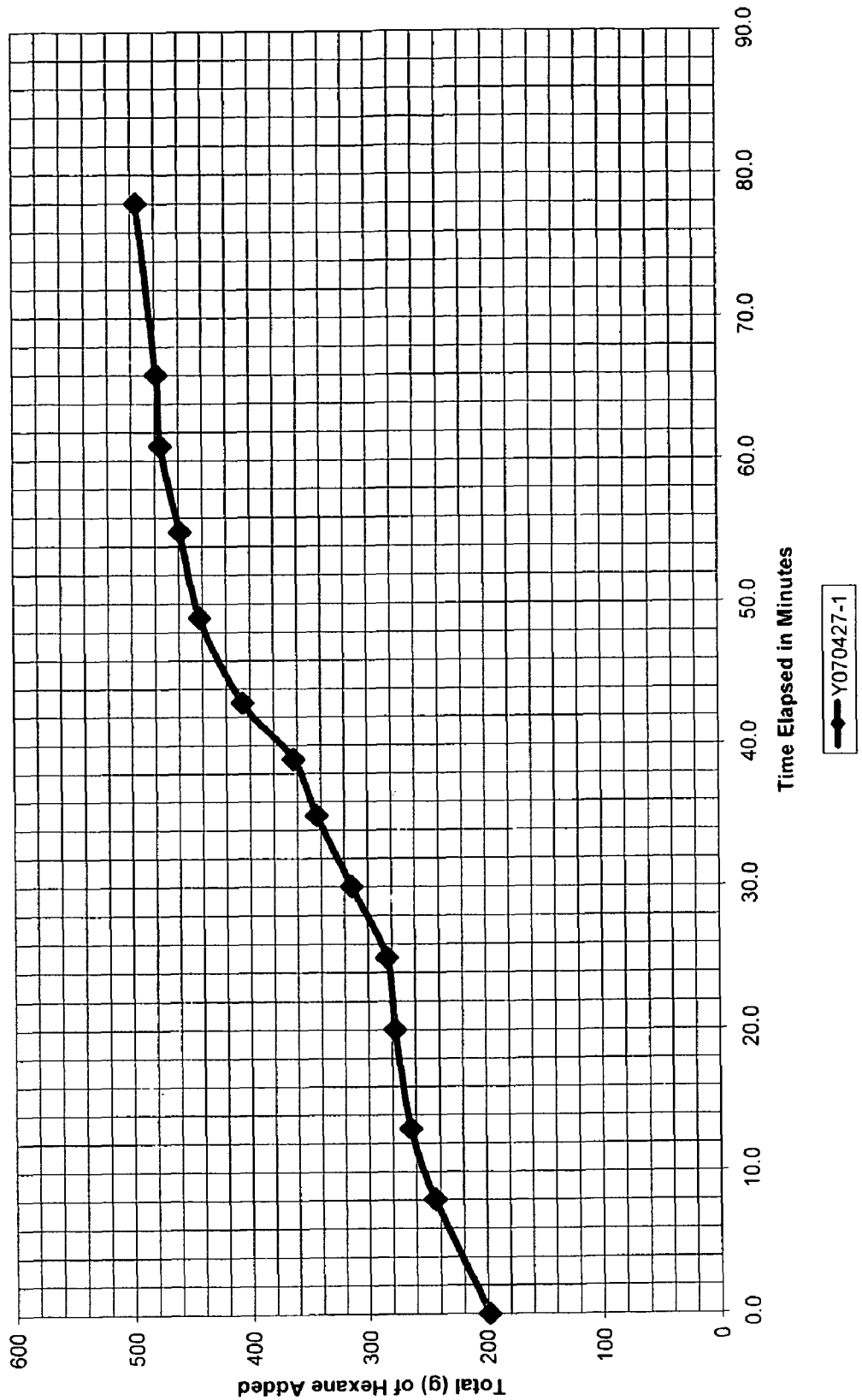

175.03 g of previously extracted guayule shrub residue feedstock Y070124-2R was placed in a 600 ml extraction vessel and extracted with pure carbon dioxide at a pressure of 5,000 psi and a temperature of 100° C. for 78 minutes. Over this time 495 g (3× the feedstock weight) of hexane was pumped into the extractor, with 198 g of hexane being pumped before introducing $CO_2$ and bringing the pressure up to 2,000, adding another 46 g while bringing the pressure up to 3,000, and then another 40 g until extract pressure and temperature reached, waiting 5 minutes, and beginning flow. The average flow rate was 3 liters/minute. The extraction was stopped prematurely because of a block in the system. 3.40 g of solid dark green rubber is collected in an extract bottle. The residue weighs 170.98 g. The protocol is further illustrated by Table 7 and FIG. 7.

TABLE 7

Y070427-1

| Elapsed time | Ratio solvent/sample | % extracted | Hexane added (ml) | Total Hexane (g) | Hexane/ sample |
|---|---|---|---|---|---|
| 0.0 | 0.0 | 0.0 | 300.0 | 198 | 1.13 |
| 8.0 | 0.0 | 0.0 | 70.0 | 244 | 1.40 |
| 13.0 | 0.0 | 0.0 | 30.0 | 264 | 1.51 |

TABLE 7-continued

Y070427-1

| Elapsed time | Ratio solvent/sample | % extracted | Hexane added (ml) | Total Hexane (g) | Hexane/ sample |
|---|---|---|---|---|---|
| 20.0 | 0.0 | 0.0 | 20.0 | 277 | 1.58 |
| 25.0 | 0.2 | 0.0 | 10.0 | 284 | 1.62 |
| 30.0 | 0.2 | 0.0 | 45.0 | 314 | 1.79 |
| 35.0 | 0.5 | 0.0 | 45.0 | 343 | 1.96 |
| 39.0 | 0.6 | 0.0 | 30.0 | 363 | 2.07 |
| 43.0 | 0.7 | 0.0 | 65.0 | 406 | 2.32 |
| 49.0 | 0.9 | 0.0 | 55.0 | 442 | 2.53 |
| 55.0 | 1.0 | 0.0 | 25.0 | 459 | 2.62 |
| 61.0 | 1.0 | 0.0 | 25.0 | 475 | 2.71 |
| 66.0 | 1.1 | 0.0 | 5.0 | 479 | 2.73 |
| 78.0 | 1.1 | 0.0 | 25.0 | 495 | 2.83 |

This experiment extracted so much rubber at such a rapid rate that it totally blocked the system. The system had to be re-piped to handle the rate at which the rubber was being extracted. This experiment illustrated a successful extraction according to the present disclosure.

EXAMPLE 8

Figure 8:
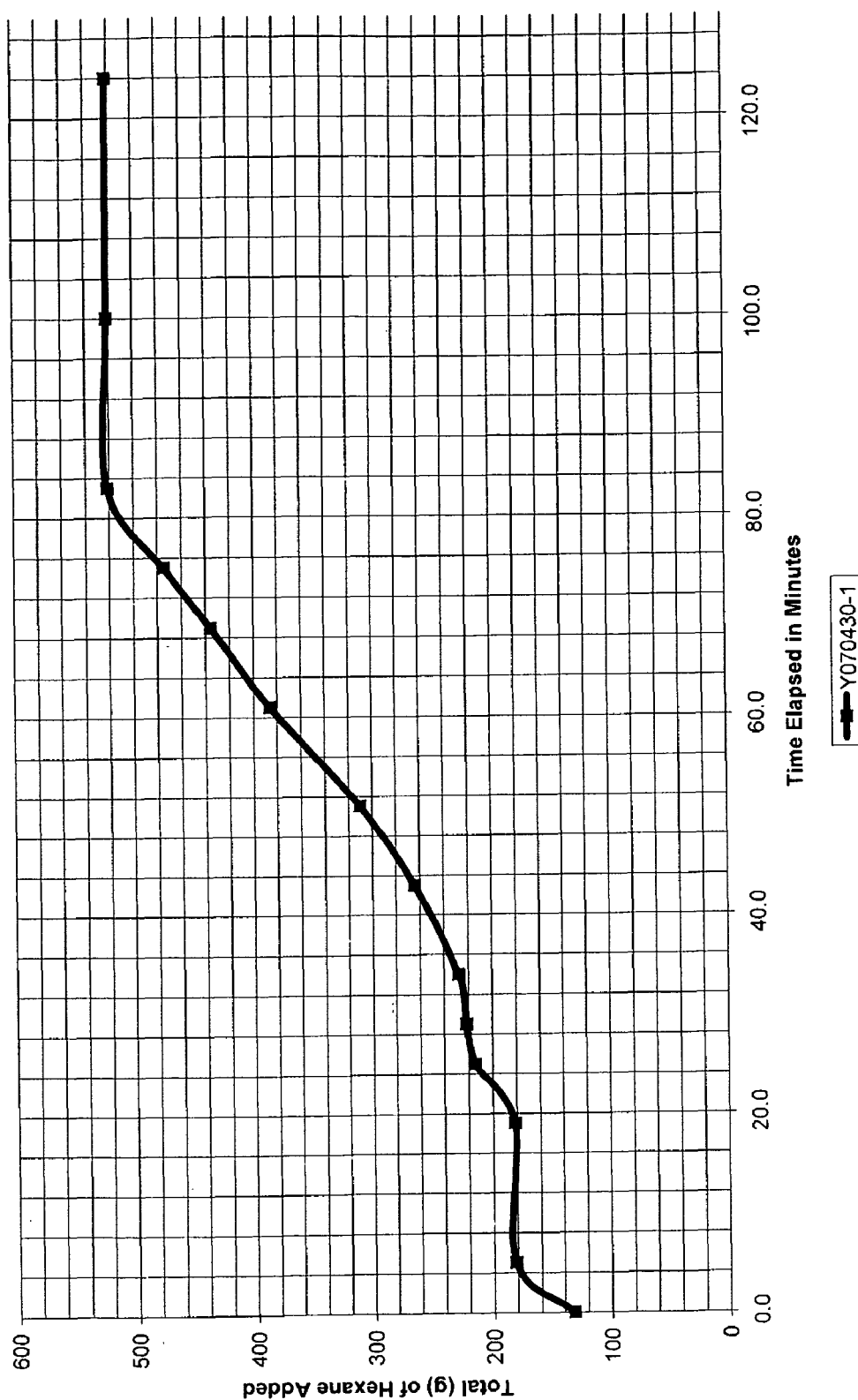

160.12 g of previously extracted guayule shrub residue feedstock Y070124-2R was placed in a 600 ml extraction vessel and extracted with pure carbon dioxide at a pressure of 7,250 psi and a temperature of 100° C. for 124 minutes. Over this time 521 g (3× the feedstock weight) of hexane was pumped into the extractor, with 132 g of hexane being pumped before introducing $CO_2$, briefly opening the CO2 and adding gas up to 1,000 psi, then pausing to replace the $CO_2$ tank to a new one and reopening, adding another 50 g and bringing pressure up to 2,000, then adding another 41 g until extract pressure and temperature reached, waiting 5 minutes, and beginning flow. The average flow rate was 4 liters/minute. 1.88 g of solid dark green rubber is collected in an extract bottle. The residue weighs 153.85 g. The protocol is further illustrated by Table 8 and FIG. 8.

TABLE 8

Y070430-1

| Elapsed time | Ratio solvent/sample | % extracted | Hexane added (ml) | Total Hexane (g) | Hexane/ sample |
|---|---|---|---|---|---|
| 0.0 | 0.0 | 0.0 | 200.0 | 132 | 0.82 |
| 5.0 | 0.0 | 0.0 | 75.0 | 182 | 1.13 |
| 19.0 | 0.0 | 0.0 | 0.0 | 182 | 1.13 |
| 25.0 | 0.0 | 0.0 | 50.0 | 215 | 1.34 |
| 29.0 | 0.0 | 0.0 | 10.0 | 221 | 1.38 |
| 34.0 | 0.2 | 0.0 | 10.0 | 228 | 1.42 |
| 43.0 | 0.5 | 0.0 | 55.0 | 264 | 1.65 |
| 51.0 | 0.8 | 0.0 | 70.0 | 310 | 1.94 |
| 61.0 | 1.3 | 0.0 | 115.0 | 386 | 2.41 |
| 69.0 | 1.7 | 0.0 | 75.0 | 436 | 2.72 |
| 75.0 | 2.0 | 0.0 | 60.0 | 475 | 2.97 |
| 83.0 | 2.4 | 0.0 | 70.0 | 521 | 3.26 |
| 100.0 | 3.1 | 0.0 | 0.0 | 521 | 3.26 |
| 124.0 | 4.2 | 0.0 | 0.0 | 521 | 3.26 |

In this experiment, the rate of hexane metering was reduced to eliminate the blocking which resulted in low extraction efficiency for rubber. This experiment confirmed that extraction efficiency is highly sensitive to hexane concentration at the start of extraction.

EXAMPLE 9

Figure 9:
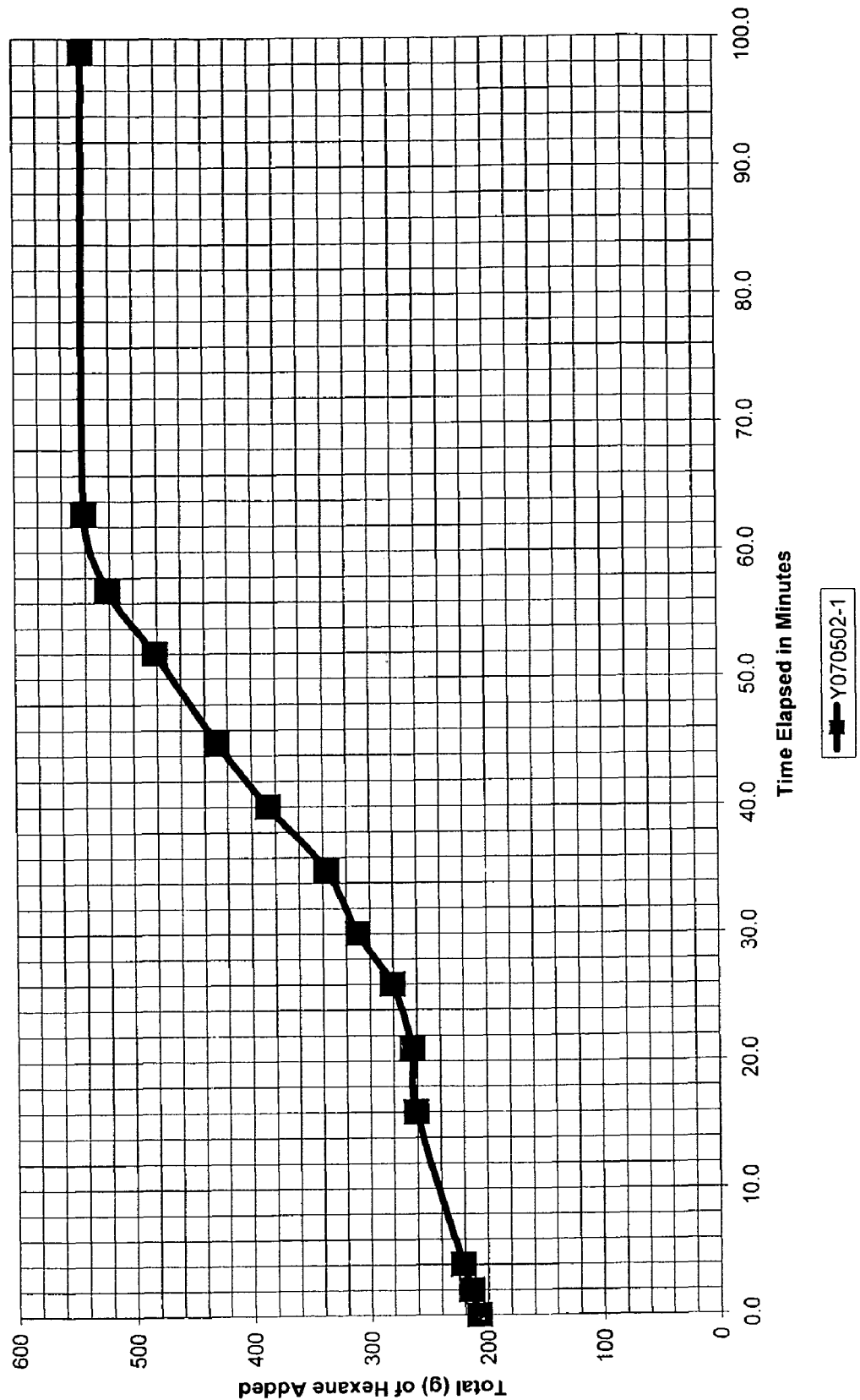

167.76 g of previously extracted guayule shrub residue feedstock Y070124-2R was placed in a 600 ml extraction vessel and extracted with pure carbon dioxide at a pressure of 7,250 psi and a temperature of 100° C. for 99 minutes. Over this time 541 g (3× the feedstock weight) of hexane was pumped into the extractor, with 208 g of hexane being pumped before introducing $CO_2$, opening $CO_2$ tank and raising pressure to 2,000 psi, adding 7 g hexane and raising pressure to 3000, then adding another 46 g until extract pressure and temperature reached, waiting 5 minutes, and beginning flow. The average flow rate was 3.3 liters/minute. 1.20 g of solid dark green rubber is collected in an extract bottle. The residue weighs 160.00 g. The protocol is further illustrated by Table 9 and FIG. 9.

TABLE 9

Y070502-1

| Elapsed time | Ratio solvent/sample | % extracted | Hexane added (ml) | Total Hexane (g) | Hexane/ sample |
|---|---|---|---|---|---|
| 0.0 | 0.0 | 0.0 | 315.0 | 208 | 1.88 |
| 2.0 | 0.0 | 0.0 | 10.0 | 215 | 0.06 |
| 4.0 | 0.0 | 0.0 | 10.0 | 221 | 0.06 |
| 16.0 | 0.0 | 0.0 | 60.0 | 261 | 0.36 |
| 21.0 | 0.2 | 0.0 | 5.0 | 264 | 0.03 |
| 26.0 | 0.4 | 0.0 | 25.0 | 281 | 0.15 |
| 30.0 | 0.6 | 0.0 | 45.0 | 310 | 0.27 |
| 35.0 | 0.8 | 0.0 | 40.0 | 337 | 0.24 |
| 40.0 | 1.0 | 0.0 | 75.0 | 386 | 0.45 |
| 45.0 | 1.1 | 0.0 | 65.0 | 429 | 0.39 |
| 52.0 | 1.4 | 0.0 | 80.0 | 482 | 0.48 |
| 57.0 | 1.5 | 0.0 | 60.0 | 521 | 0.36 |
| 63.0 | 1.7 | 0.0 | 30.0 | 541 | 0.18 |
| 99.0 | 2.9 | 0.0 | 0.0 | 541 | 0.00 |

This experiment also confirmed the importance of hexane concentration at the start of extraction with only 1.20 g of extract collected. Also, this confirmed that the $CO_2$ flow rate was too low.

EXAMPLE 10

Figure 10:
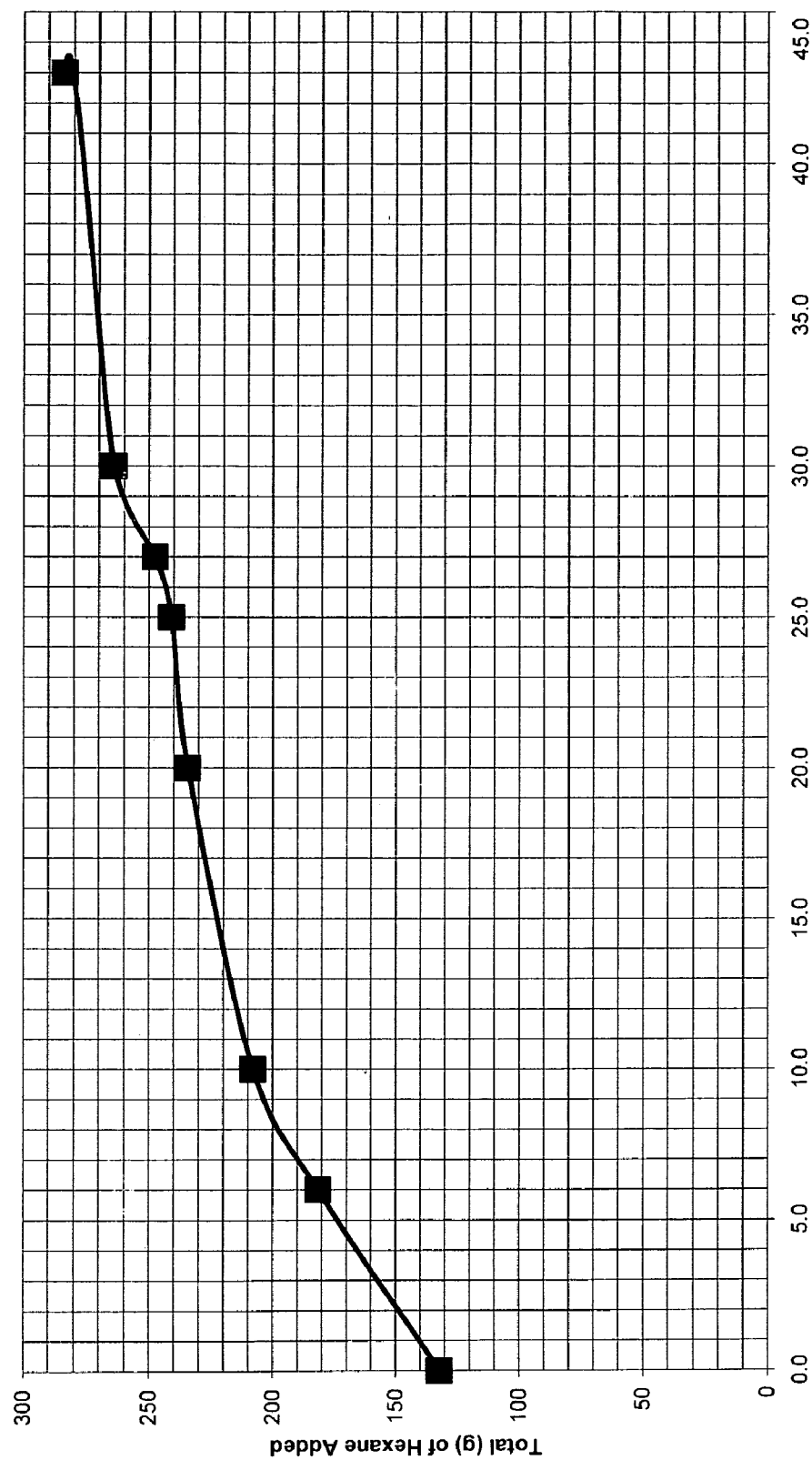

175.17 g of previously extracted guayule shrub residue feedstock Y070124-2R was placed in a 600 ml extraction vessel and extracted with pure carbon dioxide at a pressure of 7250 psi and a temperature of 100° C. for 43 minutes. Over this time 284 g (2× the feedstock weight) of hexane was pumped into the extractor, with 132 g of hexane being pumped before introducing $CO_2$, opening $CO_2$ tank, raising pressure to 2000 psi while adding 50 g hexane, adding 26 g hexane and raising pressure to 3000, then adding another 33 g until extract pressure and temperature reached, waiting 5 minutes, and beginning flow. The average flow rate was 3.0 liters/minute. The experiment was stopped prematurely because of a block in the system. Because the block occurred so early into the extraction, it was decided to reuse the residue in the next experiment after unblocking the system, as well as reusing the same extract bottle and adding the little extract recovered to the next experiment's total. The protocol is further illustrated by Table 10 and FIG. 10.

TABLE 10

Y070504-1

| Elapsed time | Ratio solvent/sample | % extracted | Hexane added (ml) | Total Hexane (g) | Hexane/ sample |
|---|---|---|---|---|---|
| 0.0 | 0.0 | 0.0 | 200.0 | 132 | 0.75 |
| 6.0 | 0.0 | 0.0 | 75.0 | 182 | 1.04 |
| 10.0 | 0.0 | 0.0 | 40.0 | 208 | 1.19 |
| 20.0 | 0.0 | 0.0 | 40.0 | 234 | 1.34 |
| 25.0 | 0.2 | 0.0 | 10.0 | 241 | 1.38 |
| 27.0 | 0.2 | 0.0 | 10.0 | 248 | 1.41 |
| 30.0 | 0.3 | 0.0 | 25.0 | 264 | 1.51 |
| 43.0 | 0.3 | 0.0 | 30.0 | 284 | 1.62 |

This experiment was stopped because of blocking in the lines, however the lines were cleared of rubber and the same extract and feedstock were used for the next experiment.

EXAMPLE 11

Figure 11:
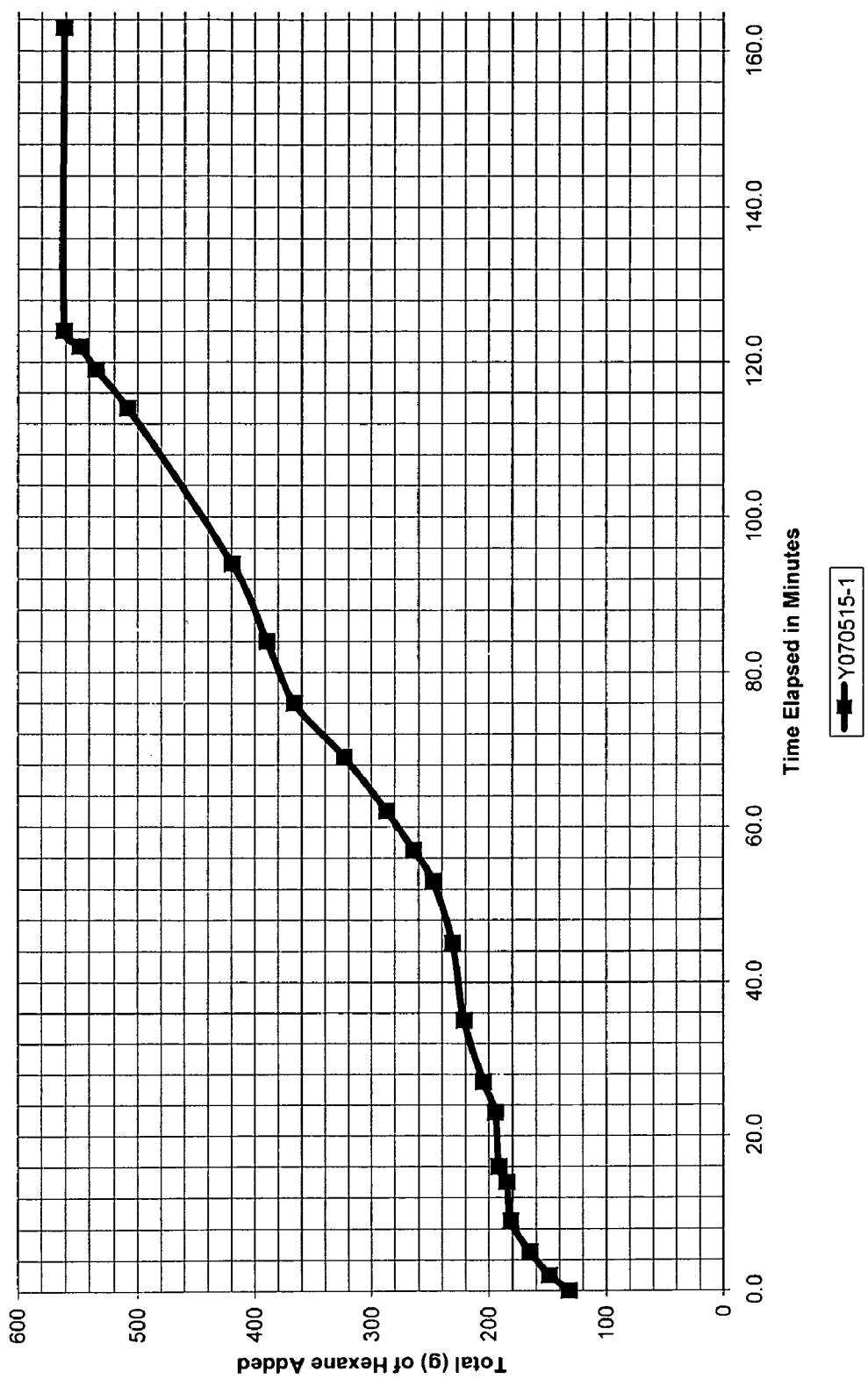

175.17 g of the residue from Y070504-1, (which was previously extracted guayule shrub residue feedstock Y070124-2R) was placed in a 600 ml extraction vessel and extracted with pure carbon dioxide at a pressure of 7,250 psi and a temperature of 100° C. for 163 minutes. Over this time 561 g (3× the feedstock weight) of hexane was pumped into the extractor, with 132 g of hexane being pumped before introducing $CO_2$, opening $CO_2$ tank and raising pressure to 2,000 psi while adding 17 g hexane, adding another 16 g hexane and raising pressure to 3,000 psi, then adding another 20 g of hexane until extract pressure and temperature reached, waiting 5 minutes, and beginning flow. The average flow rate was 1.5 liters/minute. 7.89 g of solid dark green rubber is collected in an extract bottle. The residue weighs 163.40 g. The protocol is further illustrated by Table 11 and FIG. 11.

TABLE 11

Y070515-1

| Elapsed time | Ratio solvent/sample | % extracted | Hexane added (ml) | Total Hexane (g) | Hexane/ sample |
|---|---|---|---|---|---|
| 0.0 | 0.0 | 0.0 | 200.0 | 132 | 0.75 |
| 2.0 | 0.0 | 0.0 | 25.0 | 149 | 0.85 |
| 5.0 | 0.0 | 0.0 | 25.0 | 165 | 0.94 |
| 9.0 | 0.0 | 0.0 | 25.0 | 182 | 1.04 |
| 14.0 | 0.1 | 0.0 | 5.0 | 185 | 1.05 |
| 16.0 | 0.1 | 0.0 | 10.0 | 191 | 1.09 |
| 23.0 | 0.1 | 0.0 | 5.0 | 195 | 1.11 |
| 27.0 | 0.2 | 0.0 | 15.0 | 205 | 1.17 |
| 35.0 | 0.3 | 0.0 | 25.0 | 221 | 1.26 |
| 45.0 | 0.4 | 0.0 | 15.0 | 231 | 1.32 |
| 53.0 | 0.5 | 0.0 | 25.0 | 248 | 1.41 |
| 57.0 | 0.5 | 0.0 | 25.0 | 264 | 1.51 |
| 62.0 | 0.6 | 0.0 | 35.0 | 287 | 1.64 |
| 69.0 | 0.7 | 0.0 | 55.0 | 323 | 1.85 |
| 76.0 | 0.8 | 0.0 | 65.0 | 366 | 2.09 |
| 84.0 | 0.9 | 0.0 | 35.0 | 389 | 2.22 |
| 94.0 | 1.0 | 0.0 | 45.0 | 419 | 2.39 |
| 114.0 | 1.6 | 0.0 | 135.0 | 508 | 2.90 |
| 119.0 | 1.7 | 0.0 | 40.0 | 535 | 3.05 |
| 122.0 | 1.8 | 0.0 | 20.0 | 548 | 3.13 |
| 124.0 | 1.9 | 0.0 | 20.0 | 561 | 3.20 |
| 163.0 | 3.9 | 0.0 | 0.0 | 561 | 3.20 |

This experiment was somewhat compromised by the blocking of the lines, however nearly 8 g of solid dark green extract was collected. This experiment showed the importance of high hexane levels in the extractor prior to beginning the extraction.

EXAMPLE 12

Figure 12:
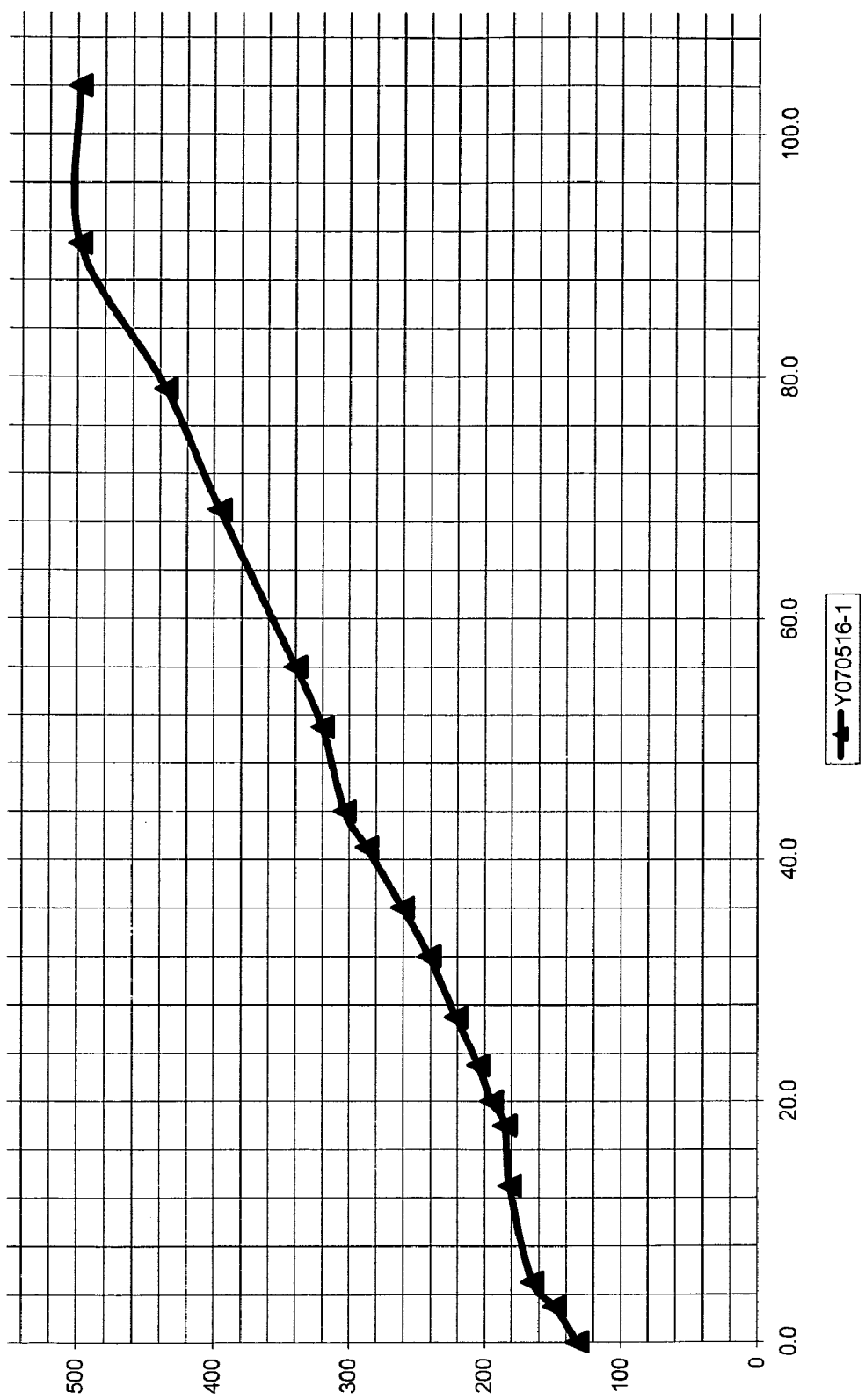

175.13 g of a mixture of previously extracted guayule shrub residue feedstock Y070124-2R and dried chopped shrub was placed in a 600 ml extraction vessel and extracted with pure carbon dioxide at a pressure of 7,250 psi and a temperature of 100° C. for 104 minutes. Over this time 498 g (3x the feedstock weight) of hexane was pumped into the extractor, with 132 g of hexane being pumped before introducing $CO_2$, opening $CO_2$ tank and raising pressure to 2000 psi while adding 17 g hexane, adding another 17 g hexane and raising pressure to 3,000 psi, then adding another 20 g of hexane until extract pressure and temperature reached, waiting 5 minutes, and beginning flow. The average flow rate was 5 liters/minute. 3.98 g of solid dark green rubber is collected in an extract bottle. The residue weighs 153.56 g. The protocol is further illustrated by Table 12 and FIG. 12.

TABLE 12

| Y070516-1 | | | | | |
| --- | --- | --- | --- | --- | --- |
| Elapsed time | Ratio solvent/sample | % extracted | Hexane added (ml) | Total Hexane (g) | Hexane/sample |
| 0.0 | 0.0 | 0.0 | 200.0 | 132 | 0.75 |
| 3.0 | 0.0 | 0.0 | 25.0 | 149 | 0.85 |
| 5.0 | 0.0 | 0.0 | 25.0 | 165 | 0.94 |
| 13.0 | 0.0 | 0.0 | 25.0 | 182 | 1.04 |
| 18.0 | 0.3 | 0.0 | 5.0 | 185 | 1.06 |
| 20.0 | 0.4 | 0.0 | 15.0 | 195 | 1.11 |
| 23.0 | 0.5 | 0.0 | 15.0 | 205 | 1.17 |
| 27.0 | 0.7 | 0.0 | 25.0 | 221 | 1.26 |
| 32.0 | 1.0 | 0.0 | 30.0 | 241 | 1.38 |
| 36.0 | 1.2 | 0.0 | 30.0 | 261 | 1.49 |
| 41.0 | 1.4 | 0.0 | 40.0 | 287 | 1.64 |
| 44.0 | 1.6 | 0.0 | 25.0 | 304 | 1.73 |
| 51.0 | 2.0 | 0.0 | 25.0 | 320 | 1.83 |
| 56.0 | 2.2 | 0.0 | 30.0 | 340 | 1.94 |
| 69.0 | 2.7 | 0.0 | 85.0 | 396 | 2.26 |
| 79.0 | 3.3 | 0.0 | 60.0 | 436 | 2.49 |
| 91.0 | 3.9 | 0.0 | 95.0 | 498 | 2.85 |
| 104.0 | 4.5 | 0.0 | 0.0 | 498 | 2.85 |

This experiment was performed with less aggressive metering of hexane during the first stage of the extraction and resulted in only 4 g of rubber being collected.

EXAMPLE 13

Figure 13:
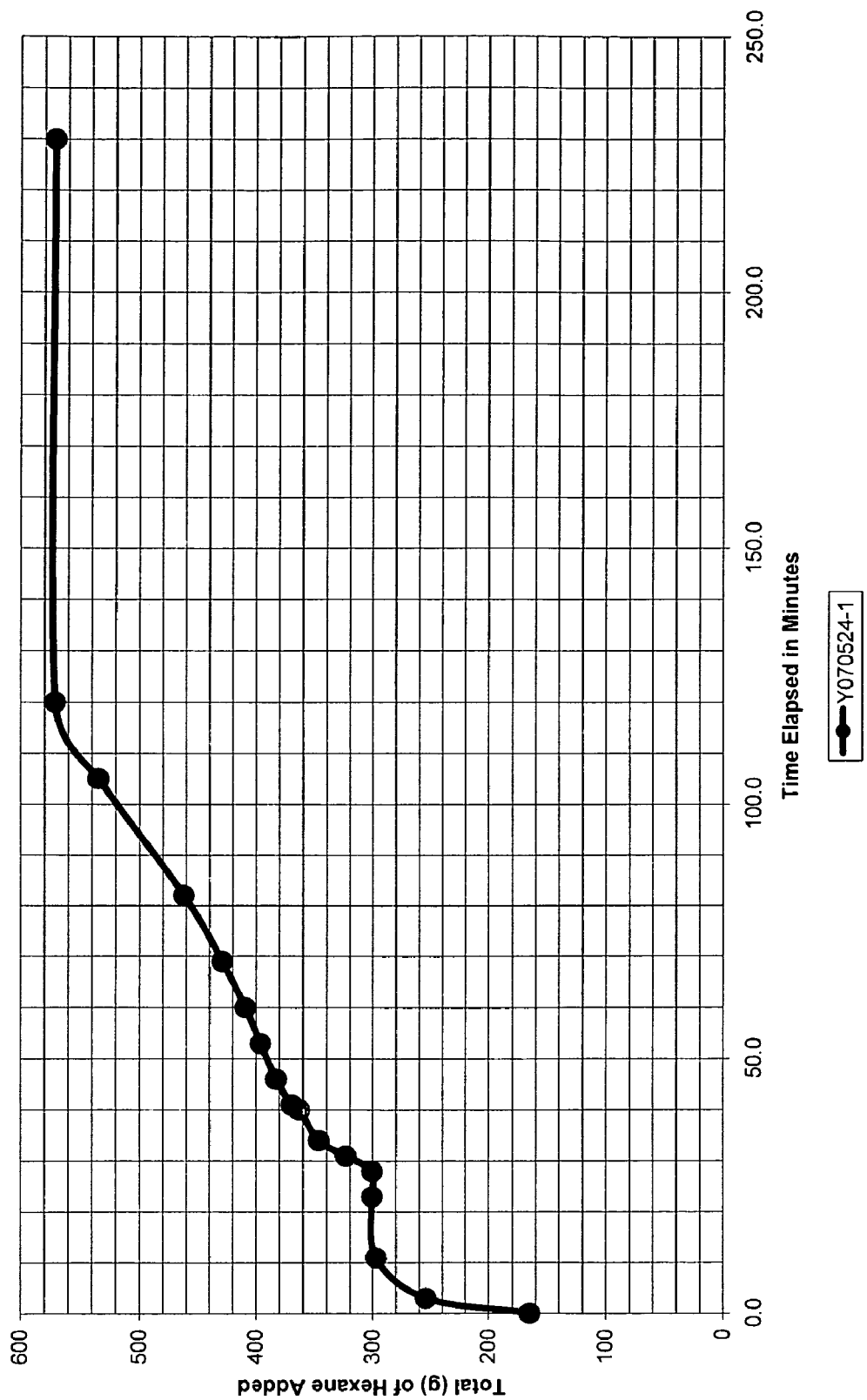

175.00 g of dried chopped ground shrub (sieved with #14 sieve) was placed in a 600 ml extraction vessel and extracted with pure carbon dioxide at a pressure of 7,250 psi and a temperature of 110° C. for 230 minutes. Over this time 571 g (3x the feedstock weight) of hexane was pumped into the extractor, with 165 g of hexane being pumped before introducing $CO_2$, opening $CO_2$ tank and raising pressure to 2,000 psi while adding 89 g hexane, and adding another 46 g of hexane until extract pressure and temperature were reached, waiting 5 minutes, and beginning flow. The average flow rate was 1.3 liters/minute. 25.25 g of solid dark green rubber is collected in an extract bottle. The residue weighs 149.24 g. The protocol is further illustrated by Table 13 and FIG. 13.

TABLE 13

| Y070524-1 | | | | | |
| --- | --- | --- | --- | --- | --- |
| Elapsed time | Ratio solvent/sample | % extracted | Hexane added (ml) | Total Hexane (g) | Hexane/sample |
| 0.0 | 0.0 | 0.0 | 250.0 | 165 | 0.94 |
| 3.0 | 0.0 | 0.0 | 135.0 | 254 | 1.45 |
| 11.0 | 0.0 | 0.0 | 65.0 | 297 | 1.70 |
| 23.0 | 0.0 | 0.0 | 5.0 | 300 | 1.72 |
| 28.0 | 0.2 | 0.0 | 0.0 | 300 | 1.72 |
| 31.0 | 0.2 | 0.0 | 35.0 | 323 | 1.85 |
| 34.0 | 0.3 | 0.0 | 35.0 | 347 | 1.98 |
| 40.0 | 0.5 | 0.0 | 25.0 | 363 | 2.07 |
| 41.0 | 0.5 | 0.0 | 10.0 | 370 | 2.11 |
| 46.0 | 0.5 | 0.0 | 20.0 | 383 | 2.19 |
| 53.0 | 0.6 | 0.0 | 20.0 | 396 | 2.26 |
| 60.0 | 0.7 | 0.0 | 20.0 | 409 | 2.34 |
| 69.0 | 0.8 | 0.0 | 30.0 | 429 | 2.45 |
| 82.0 | 0.9 | 0.0 | 50.0 | 462 | 2.64 |
| 105.0 | 1.1 | 0.0 | 110.0 | 535 | 3.05 |
| 120.0 | 1.3 | 0.0 | 55.0 | 571 | 3.26 |
| 230.0 | 2.4 | 0.0 | 0.0 | 571 | 3.26 |

This experiment was extremely successful, resulting in over 25 g of solid green extract. This high extraction efficiency was achieved utilizing 3x the feedstock weight of hexane. Part of the reason for the success of this experiment seems to be pumping a large amount of hexane into the extractor before introducing $CO_2$ then adding enough carbon dioxide to raise the pressure to 2,000 psi, when finally additional hexane was added to reach extraction pressure and a static extraction was performed for 5 minutes before beginning the dynamic extraction. Another reason for the relative success of this experiment was that we increased the extraction temperature from 100° C. to 110° C. This experiment represents a one embodied protocol according to the disclosed method.

EXAMPLE 14

Figure 14:
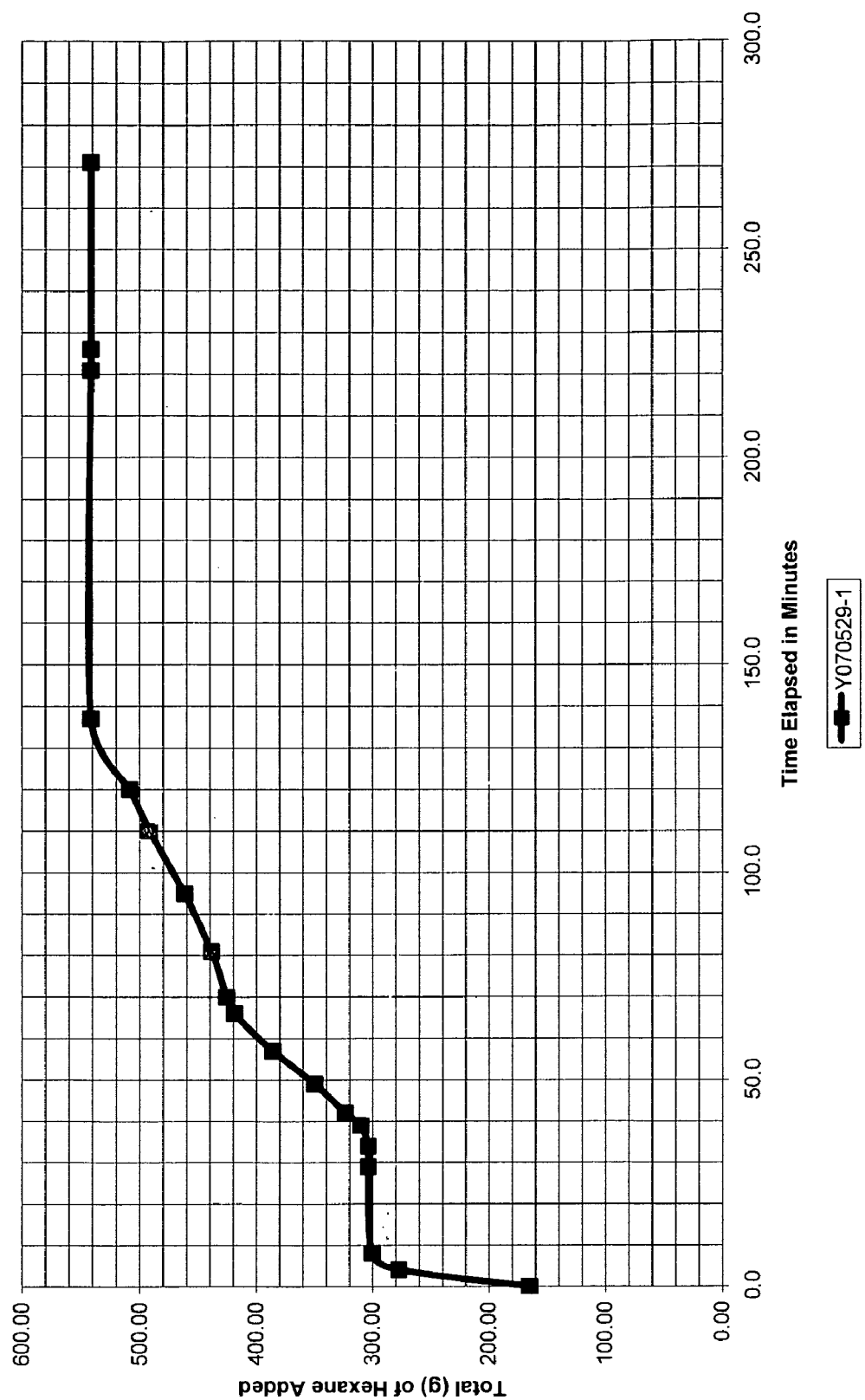

176.88 g of dried chopped ground shrub (sieved with #14 sieve) was placed in a 600 ml extraction vessel and extracted with pure carbon dioxide at a pressure of 7,250 psi and a temperature of 110° C. for 271 minutes. Over this time 541 g (3x the feedstock weight) of hexane was pumped into the extractor, with 165 g of hexane being pumped before introducing $CO_2$, opening $CO_2$ tank and raising pressure to 2,000 psi while adding 112 g hexane, and adding another 27 g of hexane until extract pressure and temperature reached, waiting 5 minutes, and beginning flow. The average flow rate was 1.0 liters/minute. 30.37 g of extract is collected in an extract bottle, with a bottom layer of solid green rubber, and a top layer of individual clumps and balls of lighter greenish yellow material. The residue weighs 151.35 g. The protocol is further illustrated by Table 14 and FIG. 14.

TABLE 14

| Y070529-1 | | | | | |
| --- | --- | --- | --- | --- | --- |
| Elapsed time | Ratio solvent/sample | % extracted | Hexane added (ml) | Total Hexane (g) | Hexane/sample |
| 0.0 | 0.0 | 0.0 | 250.0 | 165.00 | 0.93 |
| 4.0 | 0.0 | 0.0 | 170.0 | 277.20 | 1.57 |
| 8.0 | 0.0 | 0.0 | 35.0 | 300.30 | 1.70 |
| 29.0 | 0.0 | 0.0 | 5.0 | 303.60 | 1.72 |
| 34.0 | 0.1 | 0.0 | 0.0 | 303.60 | 1.72 |
| 39.0 | 0.1 | 0.0 | 10.0 | 310.20 | 1.75 |

TABLE 14-continued

Y070529-1

| Elapsed time | Ratio solvent/sample | % extracted | Hexane added (ml) | Total Hexane (g) | Hexane/ sample |
|---|---|---|---|---|---|
| 42.0 | 0.1 | 0.0 | 20.0 | 323.40 | 1.83 |
| 49.0 | 0.2 | 0.0 | 40.0 | 349.80 | 1.98 |
| 57.0 | 0.3 | 0.0 | 55.0 | 386.10 | 2.18 |
| 66.0 | 0.3 | 0.0 | 50.0 | 419.10 | 2.37 |
| 70.0 | 0.3 | 0.0 | 10.0 | 425.70 | 2.41 |
| 81.0 | 0.4 | 0.0 | 20.0 | 438.90 | 2.48 |
| 95.0 | 0.5 | 0.0 | 35.0 | 462.00 | 2.61 |
| 110.0 | 0.7 | 0.0 | 45.0 | 491.70 | 2.78 |
| 120.0 | 0.8 | 0.0 | 25.0 | 508.20 | 2.87 |
| 137.0 | 1.0 | 0.0 | 50.0 | 541.20 | 3.06 |
| 221.0 | 3.5 | 0.0 | 0.0 | 541.20 | 3.06 |
| 226.0 | 3.6 | 0.0 | 0.0 | 541.20 | 3.06 |
| 271.0 | 4.1 | 0.0 | 0.0 | 541.20 | 3.06 |

This experiment gave the best result of all the experiments performed for this study. This is probably due to the fact that the hexane was very aggressively added at the beginning of the extraction and the temperature of extraction was 110° C. The flow rate was greatly reduced to prevent plugging of the lines and over 30 g of extract was collected. In total, 3× the feedstock weight of hexane was utilized for this extraordinarily efficient rubber extraction.

EXAMPLE 15

Figure 15:
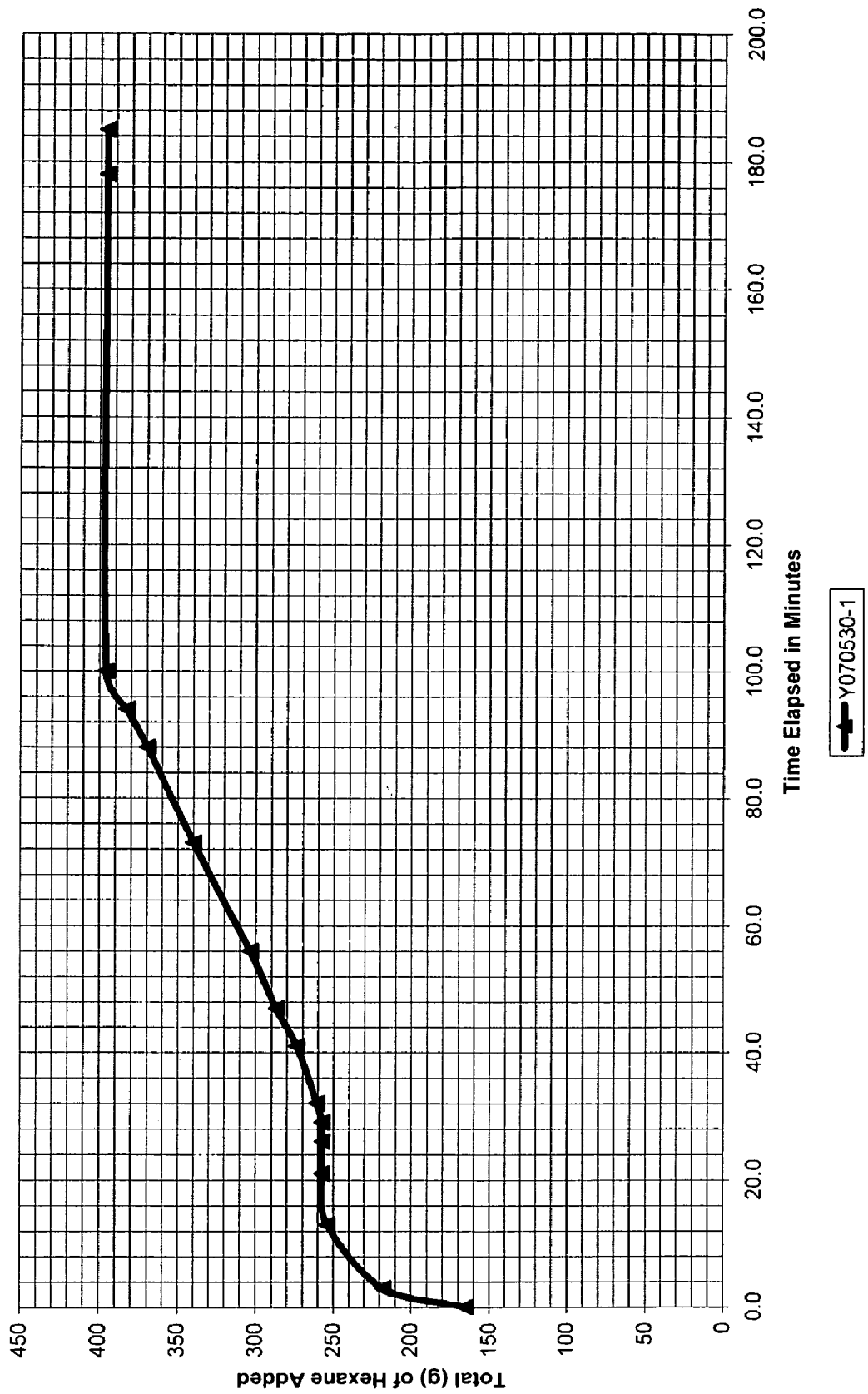

175.52 g of dried chopped ground shrub (sieved with #14 sieve) was placed in a 600 ml extraction vessel and extracted with pure carbon dioxide at a pressure of 7,250 psi and a temperature of 110° C. for 185 minutes. Over this time 396 g (2× the feedstock weight) of hexane was pumped into the extractor, with 165 g of hexane being pumped before introducing $CO_2$, opening $CO_2$ tank and raising pressure to 2,000 psi while adding 48 g hexane, and adding another 39 g of hexane until extract pressure and temperature reached, waiting 5 minutes, and beginning flow. The average flow rate was 0.7 liters/minute. 23.93 g of extract is collected in an extract bottle, with a bottom layer of solid green rubber, and a top layer of conglomerated individual clumps and balls of lighter greenish yellow material. The residue weighs 151.21 g. The protocol is further illustrated by Table 15 and FIG. 15.

TABLE 15

Y070530-1

| Elapsed time | Ratio solvent/sample | % extracted | Hexane added (ml) | Total Hexane (g) | Hexane/ sample |
|---|---|---|---|---|---|
| 0.0 | 0.0 | 0.0 | 250.0 | 165 | 0.94 |
| 3.0 | 0.0 | 0.0 | 80.0 | 218 | 1.24 |
| 13.0 | 0.0 | 0.0 | 55.0 | 254 | 1.45 |
| 21.0 | 0.0 | 0.0 | 5.0 | 257 | 1.47 |
| 26.0 | 0.0 | 0.0 | 0.0 | 257 | 1.47 |
| 29.0 | 0.0 | 0.0 | 0.0 | 257 | 1.47 |
| 32.0 | 0.0 | 0.0 | 5.0 | 261 | 1.49 |
| 41.0 | 0.1 | 0.0 | 20.0 | 274 | 1.56 |
| 47.0 | 0.1 | 0.0 | 20.0 | 287 | 1.64 |
| 56.0 | 0.1 | 0.0 | 25.0 | 304 | 1.73 |
| 73.0 | 0.2 | 0.0 | 55.0 | 340 | 1.94 |
| 88.0 | 0.3 | 0.0 | 45.0 | 370 | 2.11 |
| 94.0 | 0.3 | 0.0 | 20.0 | 383 | 2.18 |
| 100.0 | 0.4 | 0.0 | 20.0 | 396 | 2.26 |
| 178.0 | 1.2 | 0.0 | 0.0 | 396 | 2.26 |
| 185.0 | 1.2 | 0.0 | 0.0 | 396 | 2.26 |

This experiment was an attempt to reduce the total amount of hexane utilized to perform the extraction. Only 2× the feedstock weight of hexane was utilized, yet nearly 24 g of extract was collected. This experiment demonstrates that according to the present disclosure a hexane to feedstock ration in a range of approximately 2:1 to 3:1 is preferable.

EXAMPLE 16

Figure 16:
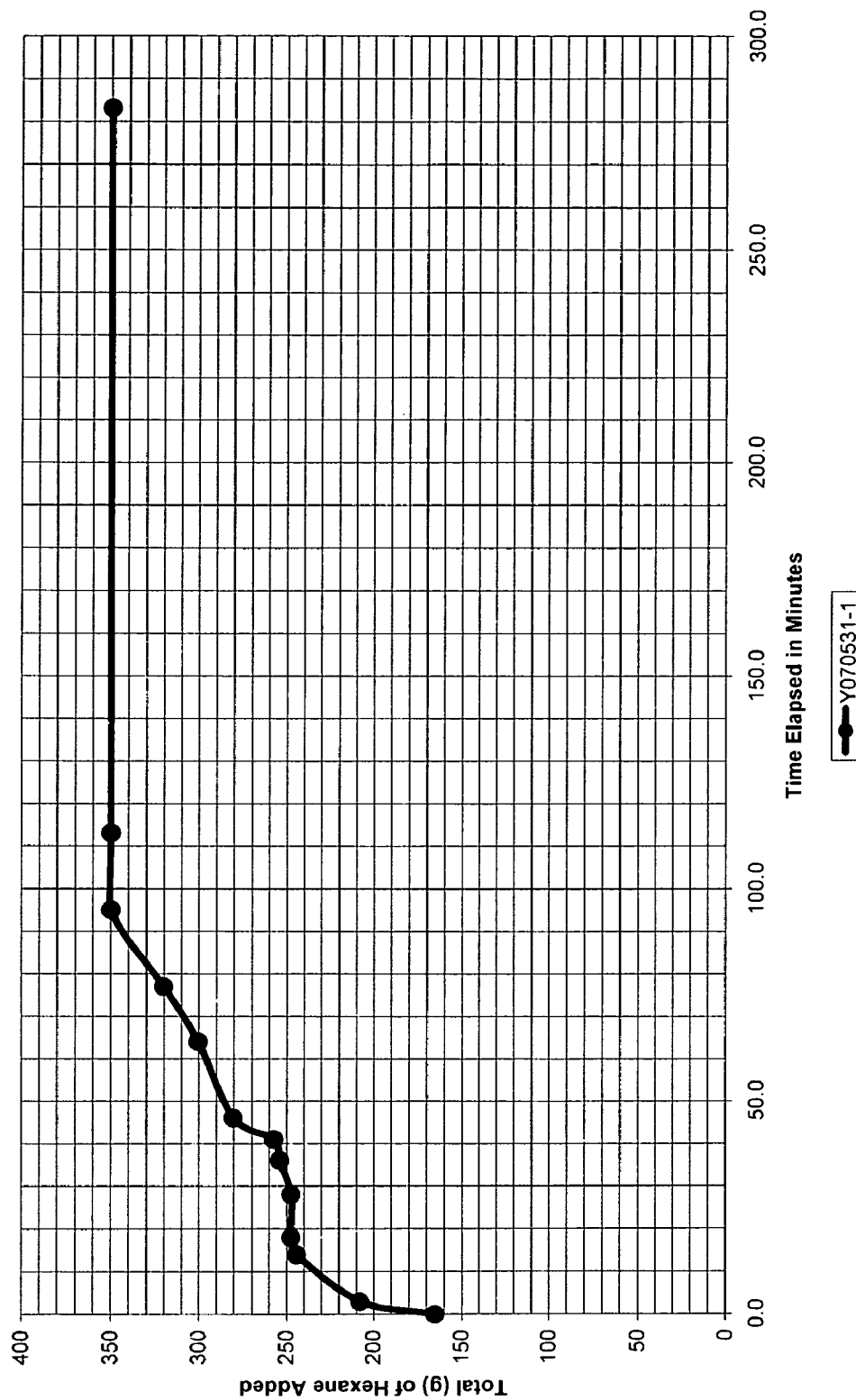

175.58 g of dried chopped ground shrub (sieved with #14 sieve) was placed in a 600 ml extraction vessel and extracted with pure carbon dioxide at a pressure of 7,250 psi and a temperature of 110° C. for 283 minutes. Over this time 350 g (2× the feedstock weight) of hexane was pumped into the extractor, with 165 g of hexane being pumped before introducing $CO_2$, opening $CO_2$ tank and raising pressure to 2,000 psi while adding 43 g hexane, and adding another 40 g of hexane until extract pressure and temperature reached, waiting 5 minutes, and beginning flow. The average flow rate was 0.25 liters/minute. 10.18 g of solid green extract is collected in one extract bottle, and 11.70 g of solid green extract is collected in another bottle. The residue weighs 155.95 g. The protocol is further illustrated by Table 16 and FIG. 16.

TABLE 16

Y070531-1

| Elapsed time | Ratio solvent/sample | % extracted | Hexane added (ml) | Total Hexane (g) | Hexane/ sample |
|---|---|---|---|---|---|
| 0.0 | 0.0 | 0.0 | 250.0 | 165 | 0.94 |
| 3.0 | 0.0 | 0.0 | 65.0 | 208 | 1.18 |
| 14.0 | 0.0 | 0.0 | 55.0 | 244 | 1.39 |
| 18.0 | 0.0 | 0.0 | 5.0 | 248 | 1.41 |
| 28.0 | 0.0 | 0.0 | 0.0 | 248 | 1.41 |
| 36.0 | 0.0 | 0.0 | 10.0 | 254 | 1.45 |
| 41.0 | 0.1 | 0.0 | 5.0 | 257 | 1.47 |
| 46.0 | 0.1 | 0.0 | 35.0 | 281 | 1.60 |
| 64.0 | 0.3 | 0.0 | 30.0 | 300 | 1.71 |
| 77.0 | 0.5 | 0.0 | 30.0 | 320 | 1.82 |
| 95.0 | 0.6 | 0.0 | 45.0 | 350 | 1.99 |
| 113.0 | 0.7 | 0.0 | 0.0 | 350 | 1.99 |
| 283.0 | 0.8 | 0.0 | 0.0 | 350 | 1.99 |

This experiment was also an attempt to perform the extraction with only 2× the feedstock weight. In spite of the similar conditions to the previous experiment (Y070531-1) less than half of the amount (11.7 g) of extract was collected. The reduced extraction efficiency was due to extending the timeframe for metering the hexane into the extractor.

Figure 17:
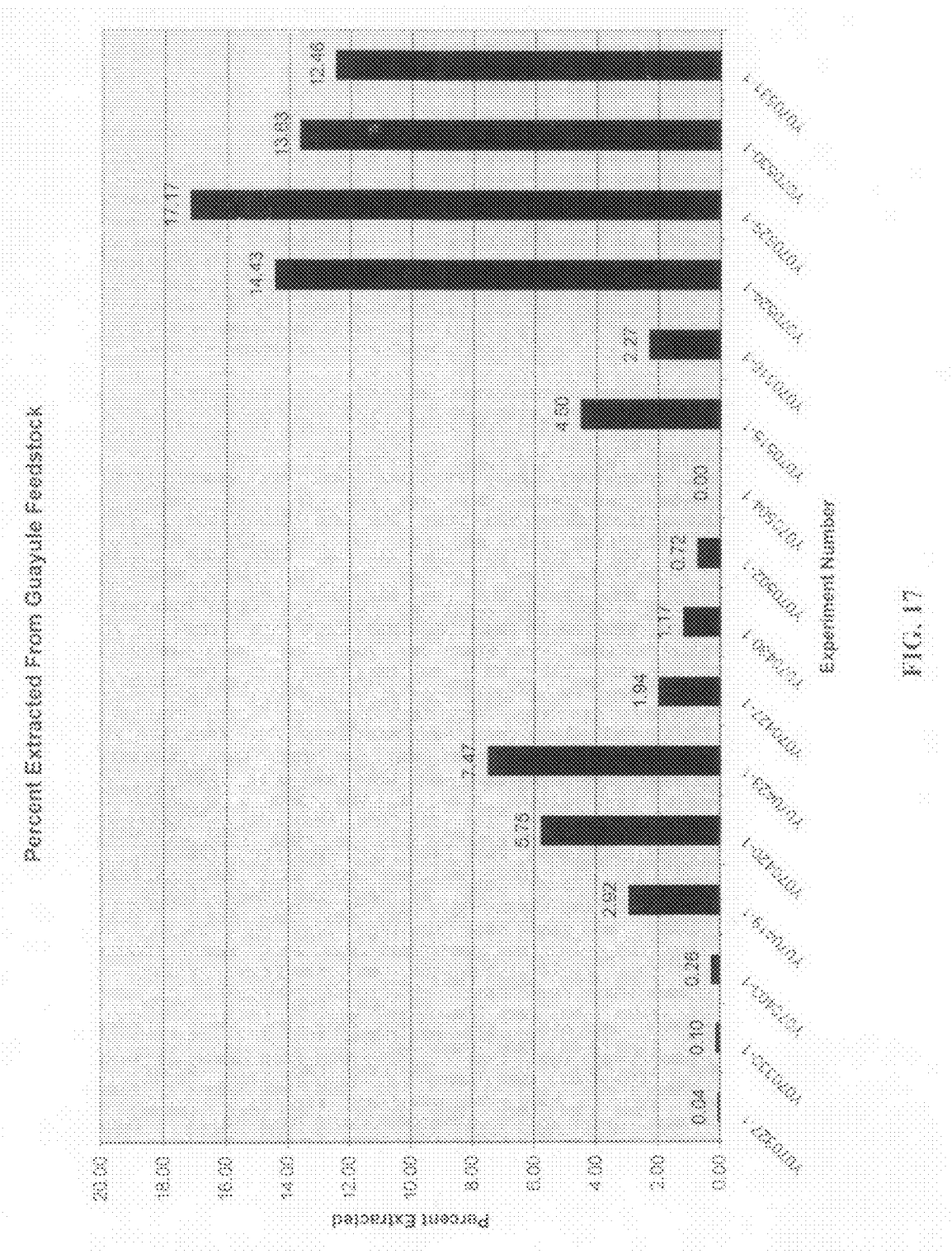
FIG. 17 graphically illustrates the wide variance of rubber extracted for each of the examples, demonstrating the preferred extraction conditions for the disclosed method.

The graph shown in FIG. 17 illustrates the wide variance of rubber extracted for each of the experiments. The main difference between the experiments that extracted nearly all of the rubber and the experiments that extracted hardly any rubber can be explained by the sequencing of the ratio of hexane to carbon dioxide over the course of the extraction.

Figure 18:
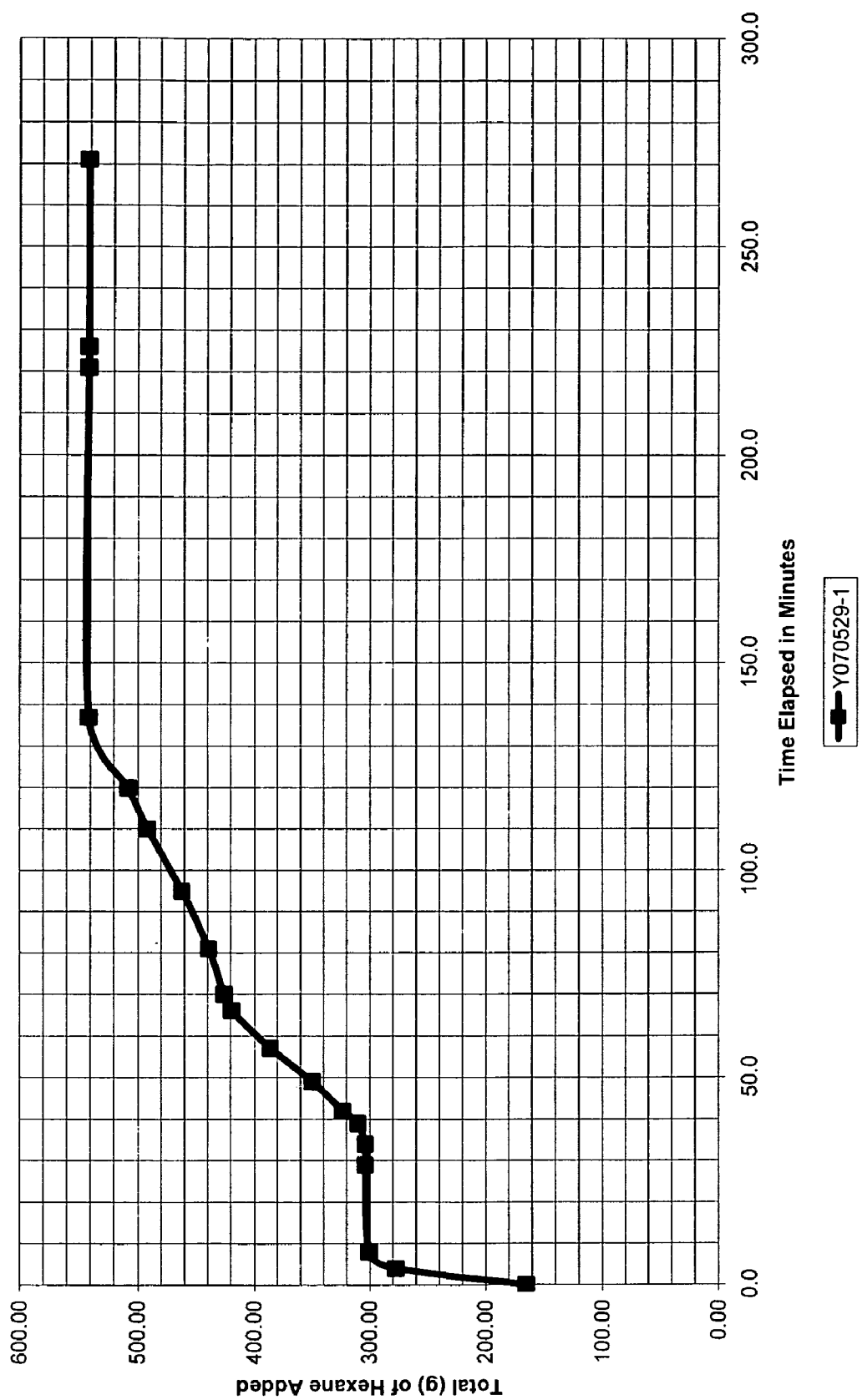
FIG. 18 graphically illustrates the accumulated rate of hexane addition according to one embodiment of the presently disclosed expanded solvent extraction method.

The graph shown in FIG. 18 shows the accumulated rate of hexane addition for the most successful experiment in which 30 grams of rubber were extracted. This experiment gave the best result of all the experiments performed in the examples. This is due to the fact that the hexane was very aggressively added at the beginning of the extraction and the temperature of extraction was 110° C. The flow rate was greatly reduced to prevent plugging of the lines and over 30 g of extract was collected. In total, 3× the feedstock weight of hexane were utilized for this extraordinarily efficient extraction.

Figure 19:
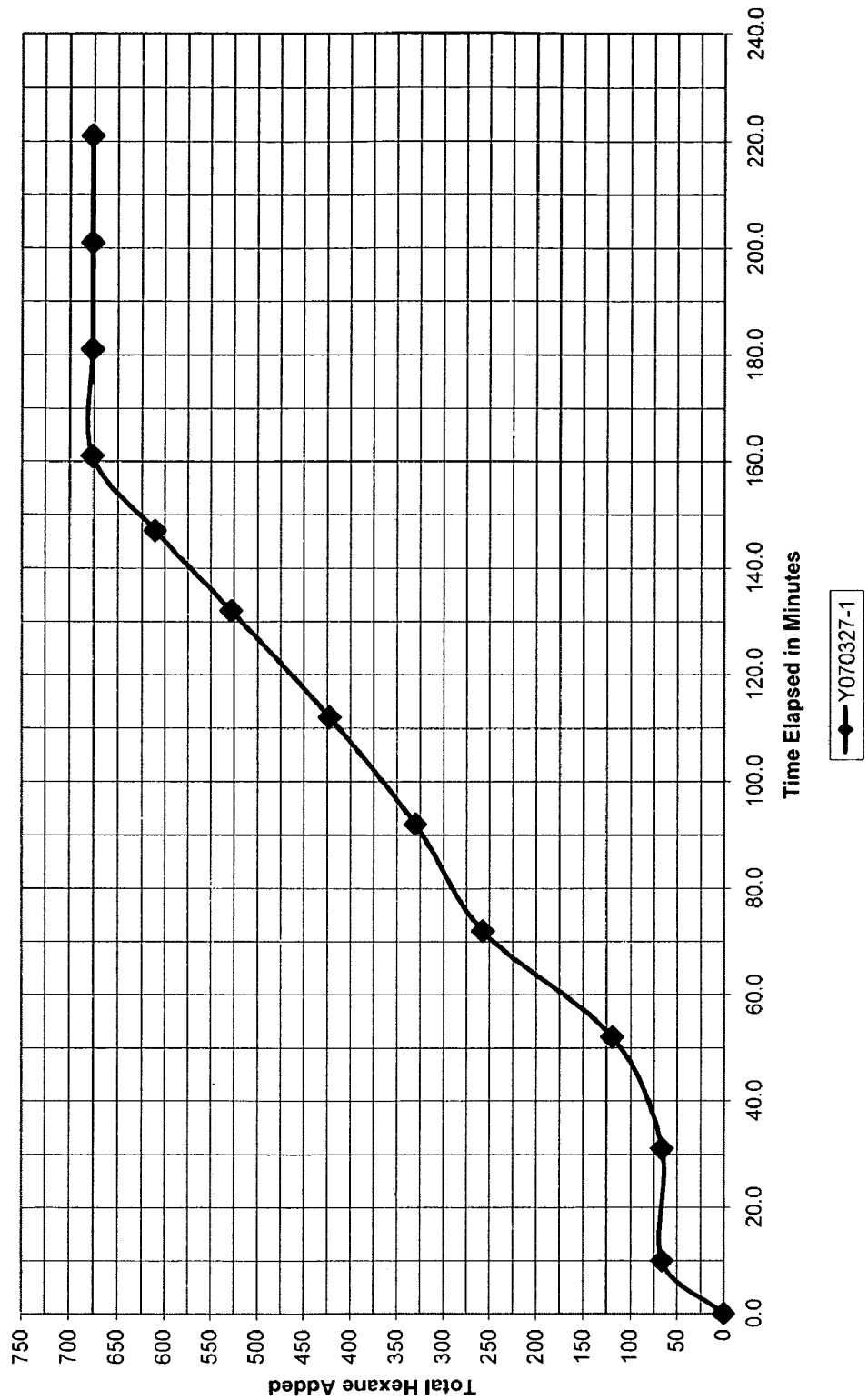
FIG. 19 graphically illustrates the accumulated rate of hexane addition which produces an unsuccessful extraction where hexane acted as a cosolvent rather than as an expanded solvent.

In sharp contrast, FIG. 19 illustrates an unsuccessful extraction using hexane as a cosolvent only instead of as an expanded cosolvent accordingly to the disclosed method.

Thus, FIG. 18 in comparison with FIG. 19 further illustrates the advantages of using an expanded hexane cosolvent extraction method over previously known supercritical carbon dioxide alone or supercritical carbon dioxide with hexane cosolvent extraction methods.

Therefore, as illustrated by the above examples, the present disclosure provides for the correct ratio of solvents used through the course of the extraction that determines a successful extraction. Therefore, according to one embodiment of the present disclosure, an expanded hexane solvent extraction comprises the following steps: 1) filling the extractor with liquid hexane (expanded with supercritical carbon dioxide), preferably in a ratio of 90% hexane and 10% carbon dioxide by weight; 2) transitioning to a two-phase supercritical/liquid system (supercritical carbon dioxide saturated with hexane/liquid hexane expanded with supercritical carbon dioxide); 3) slowly transitioning to a single phase supercritical carbon dioxide with hexane cosolvent and 4) performing a pure supercritical carbon dioxide wash of the remaining trace hexane in the residue.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicants at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

What is claimed is:

1. A method of extracting a biopolymer from a plant material, comprising:
   placing plant material in an extraction vessel;
   pumping liquid hexane into the extraction vessel;
   introducing carbon dioxide into the extraction vessel, forming an expanded hexane solvent;
   transitioning the expanded hexane solvent to a two phase supercritical/liquid system wherein supercritical carbon dioxide is saturated with the expanded hexane solvent;
   transitioning the saturated supercritical carbon dioxide into a single phase supercritical carbon dioxide and hexane cosolvent;
   performing a supercritical carbon dioxide wash; and
   extracting the biopolymer from the plant material using supercritical carbon dioxide.

2. The method of claim 1, wherein the plant material is guayule.

3. The method of claim 1, wherein the biopolymer is rubber.

4. The method of claim 1, further including extracting the plant material with carbon dioxide before pumping the liquid hexane into the extraction vessel.

5. The method of claim 1, wherein the liquid hexane pumped into the extraction vessel is in amount by weight approximately two to 2.9 times the weight of the plant material.

6. The method of claim 1, further including performing a supercritical carbon dioxide wash following supercritical carbon dioxide extraction.

7. The method of claim 6, wherein the wherein the supercritical carbon dioxide wash removes substantially all of the remaining hexane from the remaining plant material.

8. The method of claim 1, wherein the supercritical carbon dioxide and plant material form a supercritical solution.

9. The method of claim 8, wherein the extraction vessel includes a bed of ground plant material, the bed being capable of extracting the biopolymer from the supercritical solution.

10. The method of claim 8, wherein the extraction vessel includes a botanical matrix, wherein the botanical matrix is capable of extracting the biopolymer from the supercritical solution.

* * * * *